(12) United States Patent
Sugaya

(10) Patent No.: US 10,993,145 B2
(45) Date of Patent: Apr. 27, 2021

(54) COMMUNICATION DEVICE, COMMUNICATION METHOD, AND PROGRAM

(71) Applicant: SONY CORPORATION, Tokyo (JP)

(72) Inventor: Shigeru Sugaya, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 209 days.

(21) Appl. No.: 16/088,887

(22) PCT Filed: Feb. 21, 2017

(86) PCT No.: PCT/JP2017/006311
§ 371 (c)(1),
(2) Date: Sep. 27, 2018

(87) PCT Pub. No.: WO2017/183278
PCT Pub. Date: Oct. 26, 2017

(65) Prior Publication Data
US 2019/0116522 A1   Apr. 18, 2019

(30) Foreign Application Priority Data

Apr. 18, 2016 (JP) .............................. JP2016-082984

(51) Int. Cl.
*H04W 28/06* (2009.01)
*H04W 4/06* (2009.01)

(52) U.S. Cl.
CPC .......... *H04W 28/065* (2013.01); *H04W 4/06* (2013.01); *H04W 28/06* (2013.01)

(58) Field of Classification Search
CPC ...... H04W 28/065; H04W 28/06; H04W 4/06
See application file for complete search history.

(56) References Cited

U.S. PATENT DOCUMENTS 10,491,533 B1 * 11/2019 Miller ................. H04L 41/0853
2002/0057662 A1    5/2002 Lim
(Continued)

FOREIGN PATENT DOCUMENTS

EP    1 411 688 A2    4/2004
JP    2007-228408 A   9/2007
(Continued)

OTHER PUBLICATIONS

International Search Report dated Apr. 11, 2017, in PCT/JP2017/006311, filed Feb. 21, 2017.
(Continued)

*Primary Examiner* — Hassan Kizou
*Assistant Examiner* — Abdullahi Ahmed
(74) *Attorney, Agent, or Firm* — Xsensus LLP

(57) ABSTRACT

A communication device, including: a processing unit configured to generate a first protocol data unit (PDU) including first sequence number information specifying a first sequence number of a data unit set for each multicast group, multicast group information specifying a multicast group, and a data unit; and a wireless communication unit configured to transmit the first PDU generated by the processing unit. The communication device provides a mechanism capable of improving efficiency of wireless communication even in a case in which a plurality of types of multicast communication which differ in a multicast group serving as a destination are performed.

21 Claims, 21 Drawing Sheets

200A

200B

100

200C

(56) References Cited

U.S. PATENT DOCUMENTS

| | | | |
|---|---|---|---|
| 2002/0057663 A1* | 5/2002 | Lim | H04W 76/40 370/338 |
| 2006/0034317 A1* | 2/2006 | Hong | H04L 1/1614 370/445 |
| 2007/0037548 A1* | 2/2007 | Sammour | H04W 52/0235 455/343.2 |
| 2007/0206508 A1* | 9/2007 | Sammour | H04W 28/06 370/252 |
| 2007/0258466 A1* | 11/2007 | Kakani | H04L 1/1685 370/395.53 |
| 2008/0151814 A1* | 6/2008 | Jokela | H04W 74/006 370/328 |
| 2009/0249172 A1 | 10/2009 | Chin et al. | |
| 2009/0257432 A1 | 10/2009 | Yamaguchi et al. | |
| 2009/0279470 A1 | 11/2009 | Seok | |
| 2010/0153807 A1* | 6/2010 | Kakani | H04W 72/005 714/749 |
| 2011/0096710 A1* | 4/2011 | Liu | H04L 1/1628 370/312 |
| 2015/0049760 A1 | 2/2015 | Xu | |
| 2015/0208210 A1* | 7/2015 | Hanatani | H04L 9/0836 370/312 |
| 2016/0094352 A1* | 3/2016 | Thiruvenkatachari | H04L 1/22 370/312 |
| 2016/0127233 A1* | 5/2016 | Wentink | H04W 72/1289 370/392 |

FOREIGN PATENT DOCUMENTS

| | | |
|---|---|---|
| JP | 5317235 B2 | 10/2013 |
| JP | 2014-14092 A | 1/2014 |
| JP | 2014-222895 A | 11/2014 |

OTHER PUBLICATIONS

Hernandez, M. et al., "MAC frame format assignments", IEEE 802.15-15/0867r0, Nov. 9, 2015, 10 pages.

Sakoda, K. et al., "Overall Protocol of UL MU BA for Multicast Transmission", IEEE 802.11-15/1043r1, Sep. 14, 2015, pp. 1-27.

Sakoda, K. et al., "Further Study of 11ax Multicast", IEEE 802.11-15/1044r1, Sep. 14, 2015, pp. 1-23.

Extended European Search Report dated Feb. 20, 2019, issued in European Patent Application No. 17785623.4.

* cited by examiner

FIG. 4

| Multicast Group TID | Description |
|---|---|
| 0000 | Broadcast Frame / Management Frame |
| 0001~1110 | Multicast Group 1~14 |
| 1111 | Reserved |

FIG. 5

| Multicast Group TID | Description |
|---|---|
| 0000 | Management Frame |
| 0001~1110 | Multicast Group 1~14 |
| 1111 | Broadcast Frame |

COMMUNICATION DEVICE, COMMUNICATION METHOD, AND PROGRAM

TECHNICAL FIELD

The present disclosure relates to a communication device, a communication method and a program.

BACKGROUND ART

In recent years, wireless local area networks (LANs) representative of Institute of Electrical and Electronics Engineers (IEEE) 802.11 have been widely used. In addition, the number of wireless LAN-compatible products (hereinafter, also referred to as wireless communication devices) have also increased in accordance with this. In contrast, wireless communication resources available for communication are limited. Therefore, it is desirable to increase the efficiency of communication between wireless communication devices.

As an example of a technique for improving communication efficiency, a technique of reducing a communication volume in an acknowledge is known. Specifically, there is a technique of reducing a block acknowledgment request (hereinafter also referred to as a "BAR") in communication using a BAR and a block acknowledge (hereinafter also referred to as a "BA"). For example, a technique in which a communication device that has transmitted a multicast data frame transmits a BAR frame including information specifying a communication device serving as a BA frame communication target once, and each communication device serving as the BA frame communication target transmits a BA frame for the BAR frame upon receiving the BAR frame is disclosed in Patent Literature 1. As a result, the communication volume is considered to be reduced as compared with a case in which the BAR frame is transmitted to each of the communication devices serving as the BA frame communication target, that is, a case in which a plurality of BAR frames are transmitted.

Note that a communication device that transmits a BA frame generally waits to resend a frame that has been failed to be received. According to IEEE 802.11 standards, for example, sequence numbers are managed for each traffic stream, and data with sequential sequence numbers is provided to a communication upper layer. Therefore, in a case in which a part of the sequence numbers is missing, the wireless communication device waits for resending of the frame that has data corresponding to this part of the sequence numbers until the frame is successfully received.

CITATION LIST

Patent Literature

Patent Literature 1: JP 5317235B

DISCLOSURE OF INVENTION

Technical Problem

However, there is a demand for further improvement of communication efficiency. For example, in the related art represented by Patent Literature 1, in a case in which a plurality of pieces of multicast data having different destinations are transmitted, a sequence number of data may be discontinuous in a communication device that receives the multicast data (hereinafter also referred to as a "reception device"). For this reason, as described above, the reception device stands by until data related to a missing sequence number is received. However, since data related to the missing sequence number is not originally data destined for the reception device, it is never transmitted to the reception device. Therefore, the reception device keeps standing by until a timeout. Here, in a state in which some of consecutive sequence numbers are missing, data related to sequence numbers other than the missing sequence numbers is continuously held in the reception device. For this reason, free space of a data storage region is compressed, and a frame to be transmitted before the timeout is unlikely to be received. As a result, the overall efficiency of the communication is likely to decrease.

In this regard, the present disclosure proposes a mechanism which is capable of improving efficiency of wireless communication even in a case in which a plurality of types of multicast communication which differ in a multicast group serving as a destination are performed.

Solution to Problem

According to the present disclosure, there is provided a communication device, including: a processing unit configured to generate a first protocol data unit (PDU) including first sequence number information specifying a first sequence number of a data unit set for each multicast group, multicast group information specifying a multicast group, and a data unit; and a wireless communication unit configured to transmit the first PDU generated by the processing unit.

In addition, according to the present disclosure, there is provided a communication device, including: a wireless communication unit configured to receive at least a part of a first protocol data unit (PDU) including first sequence number information specifying a first sequence number of a data unit set for each multicast group, multicast group information specifying a multicast group, and a data unit; and a processing unit configured to acquire the data unit from the first PDU on a basis of the first sequence number information and the multicast group information stored in at least the part of the first PDU received by the wireless communication unit.

In addition, according to the present disclosure, there is provided a communication method, including, by a processor: generating a first protocol data unit (PDU) including first sequence number information specifying a first sequence number of a data unit set for each multicast group, multicast group information specifying a multicast group, and a data unit; and transmitting the generated first PDU.

In addition, according to the present disclosure, there is provided a communication method, including, by a processor: receiving at least a part of a first protocol data unit (PDU) including first sequence number information specifying a first sequence number of a data unit set for each multicast group, multicast group information specifying a multicast group, and a data unit; and acquiring the data unit from the first PDU on a basis of the first sequence number information and the multicast group information stored in at least the part of the received first PDU.

In addition, according to the present disclosure, there is provided a program causing a computer to implement: a processing function of generating a first protocol data unit (PDU) including first sequence number information specifying a first sequence number of a data unit set for each multicast group, multicast group information specifying a multicast group, and a data unit; and a wireless communication function of transmitting the first PDU generated by the processing unit.

In addition, according to the present disclosure, there is provided a program causing a computer to implement: a wireless communication function of receiving at least a part of a first protocol data unit (PDU) including first sequence number information specifying a first sequence number of a data unit set for each multicast group, multicast group information specifying a multicast group, and a data unit; and a processing function of acquiring the data unit from the first PDU on a basis of the first sequence number information and the multicast group information stored in at least the part of the first PDU received by the wireless communication unit.

Advantageous Effects of Invention

As described above, according to the present disclosure, it is possible to provide a mechanism which is capable of improving efficiency of wireless communication even in a case in which a plurality of types of multicast communication which differ in a multicast group serving as a destination are performed. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a diagram illustrating an example of a management form of sequence numbers in a transmission device according to one embodiment of the present disclosure.

FIG. 5 is a diagram illustrating another example of a management form of sequence numbers in a transmission device according to one embodiment of the present disclosure.

MODE(S) FOR CARRYING OUT THE INVENTION

Figure 1:
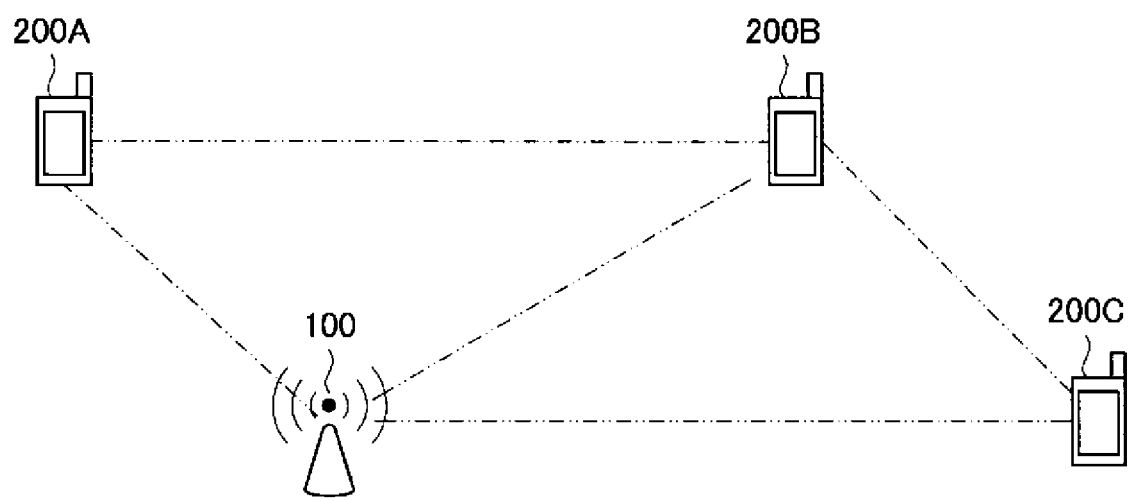
FIG. 1 is a diagram illustrating a configuration example of a communication system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of elements having substantially the same function are distinguished by adding different numbers to the end of the same reference numeral. For example, a plurality of elements having substantially the same function are distinguished as necessary like a STA 200A and a STA 200B. However, in a case where it is unnecessary to distinguish elements having substantially the same function, only the same reference numeral is added. For example, in a case where it is unnecessary to particularly distinguish the STA 200A and the STA 200B, they are simply referred to as "STAs 200."

Further, the description will proceed in the following order.

1. One embodiment of present disclosure
1-1. Configuration of communication system
1-2. Basic function of communication device
1-3. Function details of communication device
1-4. Process of communication device
1-5. Operation example of communication system
1-6. Conclusion of one embodiment of present disclosure 2. Modified examples
3. Application example
4. Conclusion

2. ONE EMBODIMENT OF PRESENT DISCLOSURE

A communication system and a communication device according to one embodiment of the present disclosure will be described.

1-1. Configuration of Communication System

First, a communication system according to one embodiment of the present disclosure will be described with reference to FIG. 1. FIG. 1 is a diagram illustrating a configuration example of a communication system according to one embodiment of the present disclosure.

A communication system according to one embodiment of the present disclosure includes a plurality of communication devices. The communication devices communicate frames with each other. Further, the communication devices have a function of communication of frames destined for a plurality of communication devices.

For example, a communication system according to the embodiment of the present disclosure includes an AP 100 and STAs 200A to 200C as illustrated in FIG. 1. The AP 100 can communicate with the respective STAs 200A to 200C, and the STA 200A can communicate with the AP 100 and the STA 200B. In addition, the STA 200B can communicate with the AP 100, the STAs 200A and 200C, and the STA 200C can communicate with the AP 100 and the STA 200B. The AP 100 individually transmits respective unicast frames to the respective STAs 200A to 200C and transmits multicast frames directed to a multicast group to which the STAs 200A to 200C belong. Note that although communication among the STAs 200A to 200C is performed via the AP 100, communication may be performed directly among the STAs 200A to 200C.

Here, there are cases in which sequence numbers are used in communication of a frame having a data unit (hereinafter also referred to simply as "data"). For example, a communication device that transmits a frame having a data unit (hereinafter also referred to as a "transmission device") transmits a frame having a sequence number corresponding to the data unit to a communication device (hereinafter also referred to as a "reception device"). Then, the reception device detects an order of the data unit included in the received frame in accordance with the sequence number. Further, the reception device also detects duplication of the data unit included in the frame using the sequence number.

However, there are cases in which the sequence numbers managed by the reception device are discontinuous in multicast communication. For example, in IEEE 802.11aa, it is specified that sequence numbers in multicast communication are generated using a sequence counter for broadcast. Further, in a case in which a plurality of types of multicast communication which differ in a multicast groups are performed, the same sequence counter is shared for the plurality of types of multicast communication. Therefore, even though a multicast frame destined for a multicast group different from a multicast group to which a certain reception device (for example, a reception device A) belongs is transmitted, the sequence number is updated. However, since the reception device A does not receive the multicast frame destined for the different multicast group, the reception device A is unable to detect the sequence number related to the multicast frame. Therefore, the sequence number related to the multicast frame is missing in the reception device A, and the sequence numbers becomes discontinuous. Further, one reason why the sequence numbers are shared as described above is because in an existing communication process, a sequence number duplication determination process is executed before a destination determination process. For example, in a case in which the sequence numbers are not shared but independently set for each multicast group, in the existing communication process, if the sequence number is duplicated, although multicast group addresses serving as the destination are different, it is determined that it has been received in duplicate, and frame reception is stopped. In order to prevent this, sharing the sequence numbers for multicast communication is considered in the existing communication process. However, retransmission control of the multicast frame at a time point at which the existing communication process has been specified has not been sufficiently reviewed by international standardization organizations or the like.

Further, due to discontinuity of the sequence numbers, efficiency in multicast communication is likely to decrease. For example, the reception device stands by until a frame having a data unit corresponding to a missing sequence number (hereinafter also referred to as a frame related to a sequence number) is received. For example, the reception device is on standby for retransmission of the frame related to the missing sequence number until a timeout relating to frame retransmission occurs. This is because it is difficult to determine whether or not the frame related to the missing sequence number is a frame destined for the reception device. However, in a case in which the missing sequence number is a sequence number related to a frame destined for a multicast group different from a multicast group to which the reception device belongs, the reception device is unable to receive the frame. Therefore, the reception device eventually stands by until a timeout occurs. Data related to a series of multicast frames is not released from the reception buffer before the timeout occurs. As a result, the empty region of the reception buffer is compressed, and thus data in other communication is not stored, and the communication efficiency may decrease.

Further, there are other factors that decrease the efficiency of multicast communication. For example, in the IEEE 802.11 standard, the sequence counter used in multicast communication is shared not only with a data frame but also with a management frame, a broadcast frame, or the like. However, a certain frame such as the broadcast frame is not generally retransmitted. For this reason, in the reception device which has not received the broadcast frame successfully, the sequence number used for the broadcast frame is missing, and the reception device keeps standing by until the broadcast frame which is not retransmitted is received. This is because the reception device is unable to determine whether the missing sequence number is a sequence number related to the multicast communication or a sequence number related to the broadcast communication. This may also result in a further decrease in the communication efficiency described above.

In this regard, in one embodiment of the present disclosure, a communication system which is capable of improving efficiency of wireless communication even in a case in which a plurality of types of multicast communication which differ in the multicast group serving as the destination are performed. Hereinafter, a communication device for realizing the communication system will be described in detail.

1-2. Basic Function of Communication Device

Figure 2:
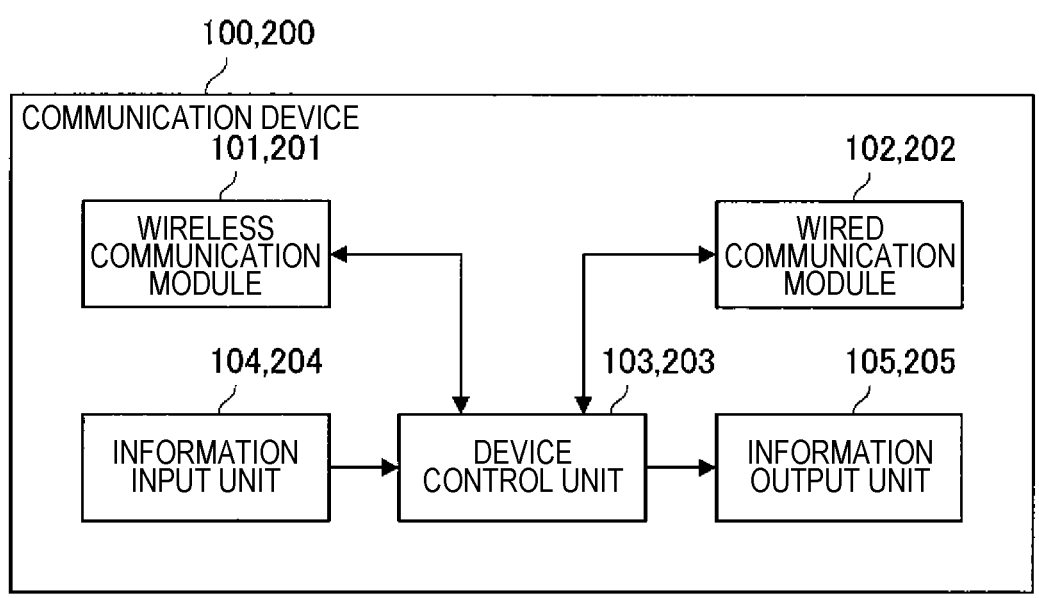
FIG. 2 is a block diagram illustrating an example of schematic functional configurations of a communication device and a reception device according to one embodiment of the present disclosure.

Next, basic functions of a transmission device 100 and a reception device 200 that are communication devices according to one embodiment of the present disclosure will be described. First, functional configurations of the transmission device 100 and the reception device 200 according to one embodiment of the present disclosure will be described with reference to FIG. 2. FIG. 2 is a block diagram illustrating an example of schematic functional configurations of a transmission device 100 and a reception device 200 according to one embodiment of the present disclosure. Further, since the basic functions of the transmission device 100 and the reception device 200 are substantially the same, only the transmission device 100 will be described.

As illustrated in FIG. 2, a transmission device 100 includes a wireless communication module 101, a wired communication module 102, a device control unit 103, an information input unit 104, and an information output unit 105.

The wireless communication module 101 performs wireless communication with external devices. Specifically, the wireless communication module 101 transmits data obtained from the device control unit 103 and provides received data to the device control unit 103. The details will be described later.

The wired communication module 102 communicates with an external device via wired communication. Specifically, the wired communication module 102 is connected to the Internet and communicates with the external device via the Internet. For example, the wired communication module 102 transmits data acquired via communication by the wireless communication module 101 to the external device via the Internet.

The device control unit 103 controls operation of the transmission device 100 in general. Specifically, the device control unit 103 controls communication of the wireless communication module 101 and the wired communication module 102. For example, the device control unit 103 causes the wireless communication module 101 or the wired communication module 102 to transmit data obtained from the information input unit 104. Further, the device control unit 103 causes the information output unit 105 to output data obtained by the communication of the wireless communication module 101 or the wired communication module 102.

The information input unit 104 receives an input from the outside of the transmission device 100. Specifically, the information input unit 104 receives a user input or information obtained from a sensor. For example, the information input unit 104 is an input device such as a keyboard or a touch panel or a detection device such as a sensor.

The information output unit 105 outputs data. Specifically, the information output unit 105 outputs data instructed from the device control unit 103. For example, the information output unit 105 is a display that outputs images on the basis of image information, a speaker that outputs sounds or music on the basis of audio information, or the like.

Further, the wired communication module 102, the information input unit 104 and the information output unit 105 among the above components may not be included in the transmission device 100.

(Configuration of Wireless Communication Module)

Figure 3:
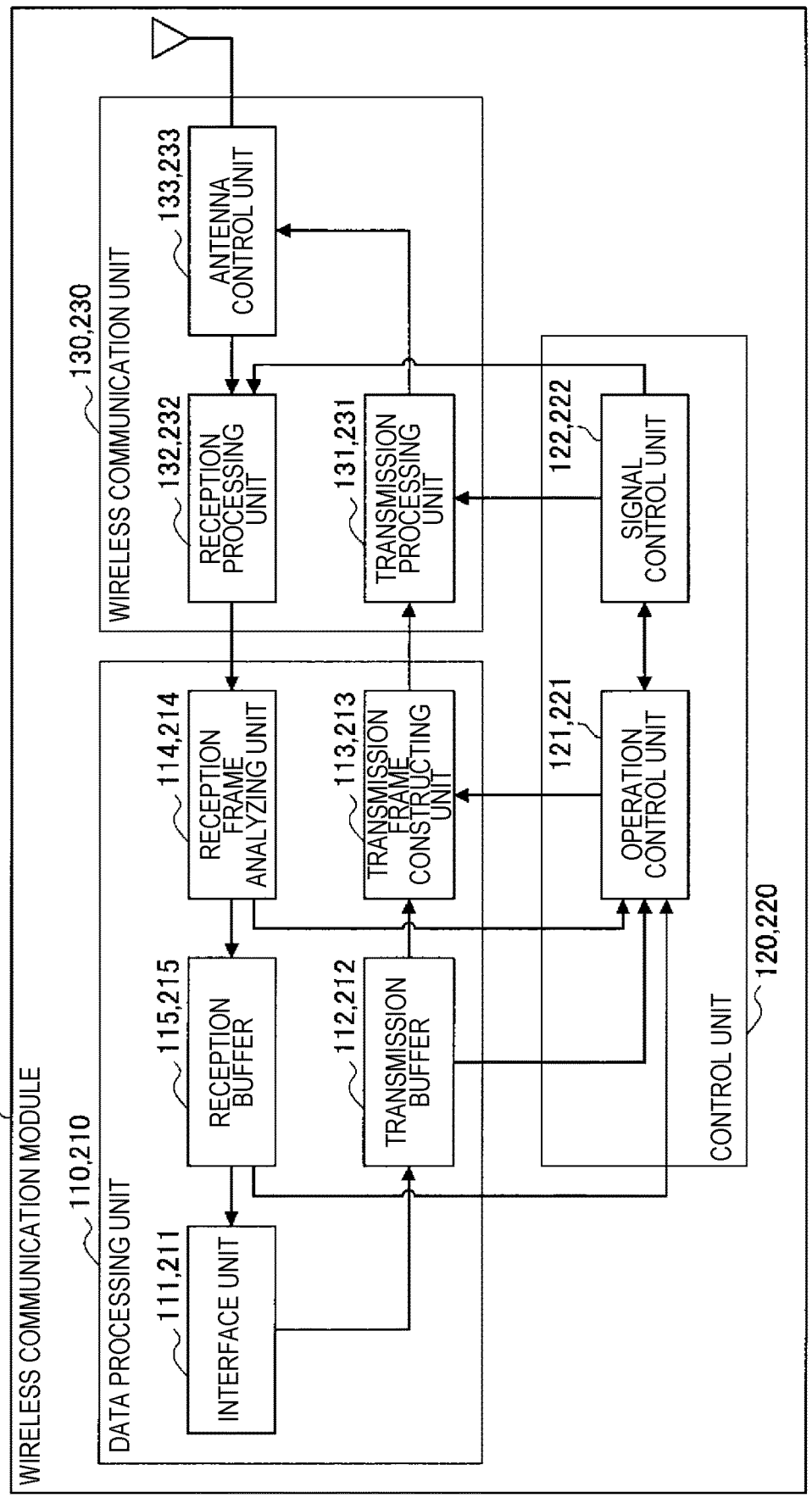
FIG. 3 is a block diagram illustrating an example of a schematic functional configuration of a wireless communication module according to the embodiment of the present disclosure.

Next, a functional configuration of the wireless communication module 101 will be described with reference to FIG. 3. FIG. 3 is a block diagram illustrating an example of a schematic functional configuration of the wireless communication module 101 according to an embodiment of the present disclosure.

As illustrated in FIG. 3, the wireless communication module 101 includes a data processing unit 110, a control unit 120, and a wireless communication unit 130.

(1. Data Processing Unit)

The data processing unit 110 includes an interface unit 111, a transmission buffer 112, a transmission frame constructing unit 113, a reception frame analyzing unit 114, and a reception buffer 115 as illustrated in FIG. 3 as the processing unit.

The interface unit 111 is an interface connected to other functional components installed in the transmission device 100. Specifically, the interface unit 111 performs reception of data that is desired to be transmitted from another functional component, for example, the device control unit 103, provision of reception data to the device control unit 103, or the like.

The transmission buffer 112 stores data to be transmitted. Specifically, the transmission buffer 112 stores data obtained by the interface unit 111.

The transmission frame constructing unit 113 generates a frame to be transmitted. Specifically, the transmission frame constructing unit 113 generates a frame on the basis of data stored in the transmission buffer 112 or control information set by the control unit 120. For example, the transmission frame constructing unit 113 generates a frame (packet) from data acquired from the transmission buffer 112, and performs a process of adding a MAC header for medium access control (MAC) and an error detection code to the generated frame and the like.

The reception frame analyzing unit 114 analyzes a received frame. Specifically, the reception frame analyzing unit 114 determines a destination of a frame received by the wireless communication unit 130 and acquires data or control information included in the frame. For example, the reception frame analyzing unit 114 acquires data and the like included in the received frame by performing analysis of the MAC header, detection and correction of a code error, a reordering process, and the like on the received frame.

The reception buffer 115 stores received data. Specifically, the reception buffer 115 stores data acquired by the reception frame analyzing unit 114. For example, the reception buffer 115 continues to hold data which is a part of a predetermined series of data until a predetermined series of data is obtained. Then, if the predetermined series of data is obtained, the predetermined series of data is provided to a communication upper layer via the interface unit 111.

(2. Control Unit)

The control unit 120 includes an operation control unit 121 and a signal control unit 122 as illustrated in FIG. 3 as parts of the processing unit and the acquisition unit.

The operation control unit 121 controls an operation of the data processing unit 110. Specifically, the operation control unit 121 controls the occurrence of communication. For example, if a communication connection request occurs, the operation control unit 121 causes the data processing unit 110 to generate frames related to a connection process or an authentication processing such as an association process or an authentication process.

Further, the operation control unit 121 controls generation of frames on the basis of a storage state of data in the transmission buffer 112, an analysis result for a reception frame, or the like. For example, in a case in which data is stored in the transmission buffer 112, the operation control unit 121 instructs the transmission frame constructing unit 113 to generate a data frame in which the data is stored. Further, in a case in which reception of a frame is confirmed by the reception frame analyzing unit 114, the operation control unit 121 instructs the transmission frame constructing unit 113 to generate an acknowledgment frame which is a response to a received frame.

The signal control unit 122 controls an operation of the wireless communication unit 130. Specifically, the signal control unit 122 controls a transmission/reception process of the wireless communication unit 130. For example, the signal control unit 122 causes the wireless communication unit 130 to set a parameter for transmission and reception on the basis of an instruction from the operation control unit 121.

Further, the information related to the sequence number is managed by the control unit 120. For example, the control unit 120 manages the sequence number for each multicast group. Further, the control unit 120 manages multicast group information specifying the multicast group.

(3. Wireless Communication Unit)

As illustrated in FIG. 3, the wireless communication unit 130, as a communication unit, includes a transmission processing unit 131, a reception processing unit 132, and an antenna control unit 133.

The transmission processing unit 131 performs a frame transmission process. Specifically, the transmission processing unit 131 generates a signal to be transmitted on the basis of a frame provided from the transmission frame constructing unit 113. More specifically, the transmission processing unit 131 generates a signal related to a frame on the basis of a parameter set in accordance with an instruction from the signal control unit 122. For example, the transmission processing unit 131 generates a symbol stream by performing encoding, interleaving, and modulation on the frame provided from the data processing unit 110 in accordance with a coding and modulation scheme instructed by the control unit 120. Further, the transmission processing unit 131 converts the signal related to the symbol stream obtained by the process at the previous stage into an analog signal, and performs amplification, filtering, and frequency up-conversion on the resulting signal.

The reception processing unit 132 performs a frame reception process. Specifically, the reception processing unit 132 restores the frame on the basis of the signal provided from the antenna control unit 133. For example, the reception processing unit 132 acquires a symbol stream by performing a process opposite to the signal transmission, for example, frequency down-conversion, digital signal conversion, and the like on a signal obtained from an antenna. Further, the reception processing unit 132 acquires a frame by performing demodulation, decoding, and the like on the symbol stream obtained by the process at the previous stage and provides the acquired frame to the data processing unit 110 or the control unit 120.

The antenna control unit 133 controls transmission and reception of signals via at least one antenna. Specifically, the antenna control unit 133 transmits the signal generated by the transmission processing unit 131 via the antenna and provides the signal received via the antenna to the reception processing unit 132.

1-3. Function Details of Communication Device

Next, functions of the transmission device 100 and the reception device 200 according to one embodiment of the present disclosure will be described.

(A. Transmission Device)

First, functions of the transmission device 100 will be described.

(A-1. Setting of Multicast-Related Information)

The transmission device 100 sets multicast-related information in a case in which the multicast communication is requested. Specifically, in a case in which the multicast communication is requested from a communication upper layer, the control unit 120 sets the multicast group information specifying the multicast group. As the multicast group information, there is multicast group information set for each piece of information specifying a communication purpose. For example, the control unit 120 sets an ID corresponding to a multicast group (hereinafter also referred to as a "multicast group TID") for each traffic identifier (TID) specifying a type of communication traffic as the multicast group information. Further, the multicast group information may be shared with the reception device 200 before the start of the multicast communication. Specifically, if the multicast group information is set, a frame having the multicast group information set before the start of the multicast communication may be transmitted to the reception device 200. For example, in a case in which a video delivery service using the multicast communication is provided, a server that provides the video delivery service and operates as the transmission device 100 sets the multicast group information for each video delivery service. Then, if a specific video delivery service is requested from a client operating as the reception device 200, the server notifies of an approval for the request and notifies of the multicast group information for the specific video delivery service.

Further, the control unit 120 sets sequence number information for each multicast group. Specifically, the control unit 120 sets sequence number information specifying a sequence number of a data unit (first sequence number) (first sequence number information) for each multicast group. Then, the control unit 120 manages the sequence number for each multicast group TID. In detail, the sequence counter is provided for each multicast group TID. Further, management of the sequence numbers in the transmission device 100 will be described in detail with reference to FIGS. 4 and 5. FIG. 4 is a diagram illustrating an example of a management form of the sequence numbers in the transmission device 100 according to one embodiment of the present disclosure. FIG. 5 is a diagram illustrating another example of the management form of the sequence numbers in the transmission device 100 according to one embodiment of the present disclosure.

The control unit 120 manages the sequence number used for each multicast group using the multicast group TID. For example, multicast groups TID0001 to TID1110 are associated with 14 multicast groups, as illustrated in FIG. 4. Further, a sequence counter is set for every 14 multicast group TIDs. Further, a multicast group TID1111 may be reserved for future extension.

Further, the multicast group TID may have information specifying a communication scheme other than the multicast communication. For example, a multicast group TID0000 is associated with communication of the broadcast frame and the management frame as illustrated in FIG. 4. Further, a sequence counter for the multicast group TID0000 is set.

Further, communication of the broadcast frame and communication of the management frame may be distinguished. For example, as illustrated in FIG. 5, the multicast group TID0000 is associated with the communication of the management frame, and the multicast group TID1111 is associated with the communication of the broadcast frame. In this case, the sequence counter for the multicast group TID0000 and the sequence counter for the multicast group TID1111 are separately set. This is to distinguish the communication of the management frame and the communication of the broadcast frame. Accordingly, unlike the communication of the management frame, it is possible to prevent frame retransmission from being on standby in the communication of the broadcast frame in which it is rare for frame retransmission to be scheduled.

Further, in the above example, the number of multicast groups associated with the multicast group TID is 14, but it may be 13 or less, or 15 or more. Here, setting the number of multicast group TIDs to 16 or less is meaningful as it is possible to use the existing frame format as will be described later.

Further, the multicast group TID may not have information specifying a communication scheme other than the multicast communication. In this case, the maximum number of multicast groups that can use the multicast group TID can be increased. Further, the communication other than the multicast communication may be determined on the basis of the presence or absence of the multicast group TID.

(A-2. Transmission of PDU)

Figure 6:
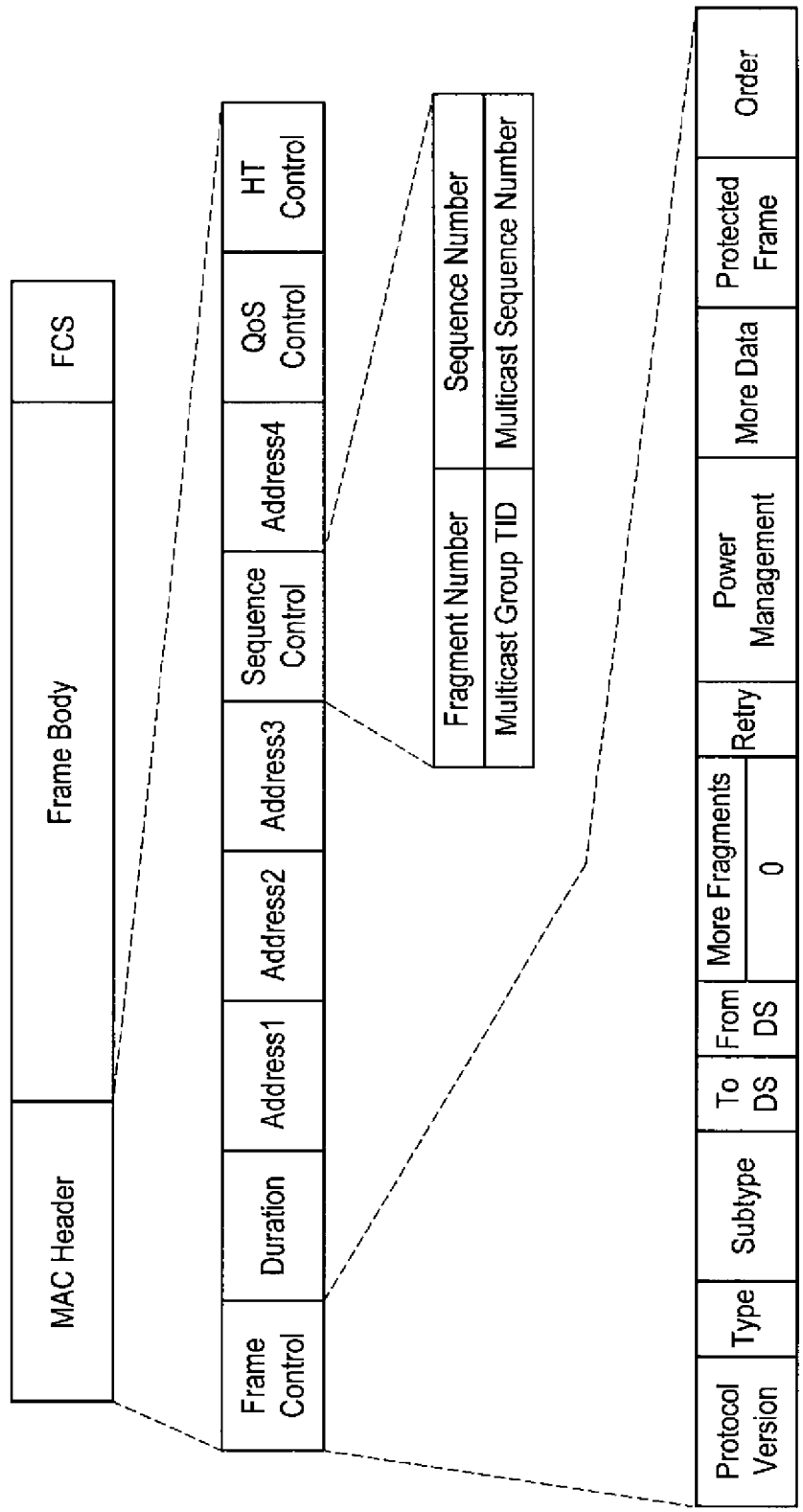
FIG. 6 is a diagram illustrating an example of a format of a first PDU transmitted by a transmission device according to one embodiment of the present disclosure.
Figure 7:
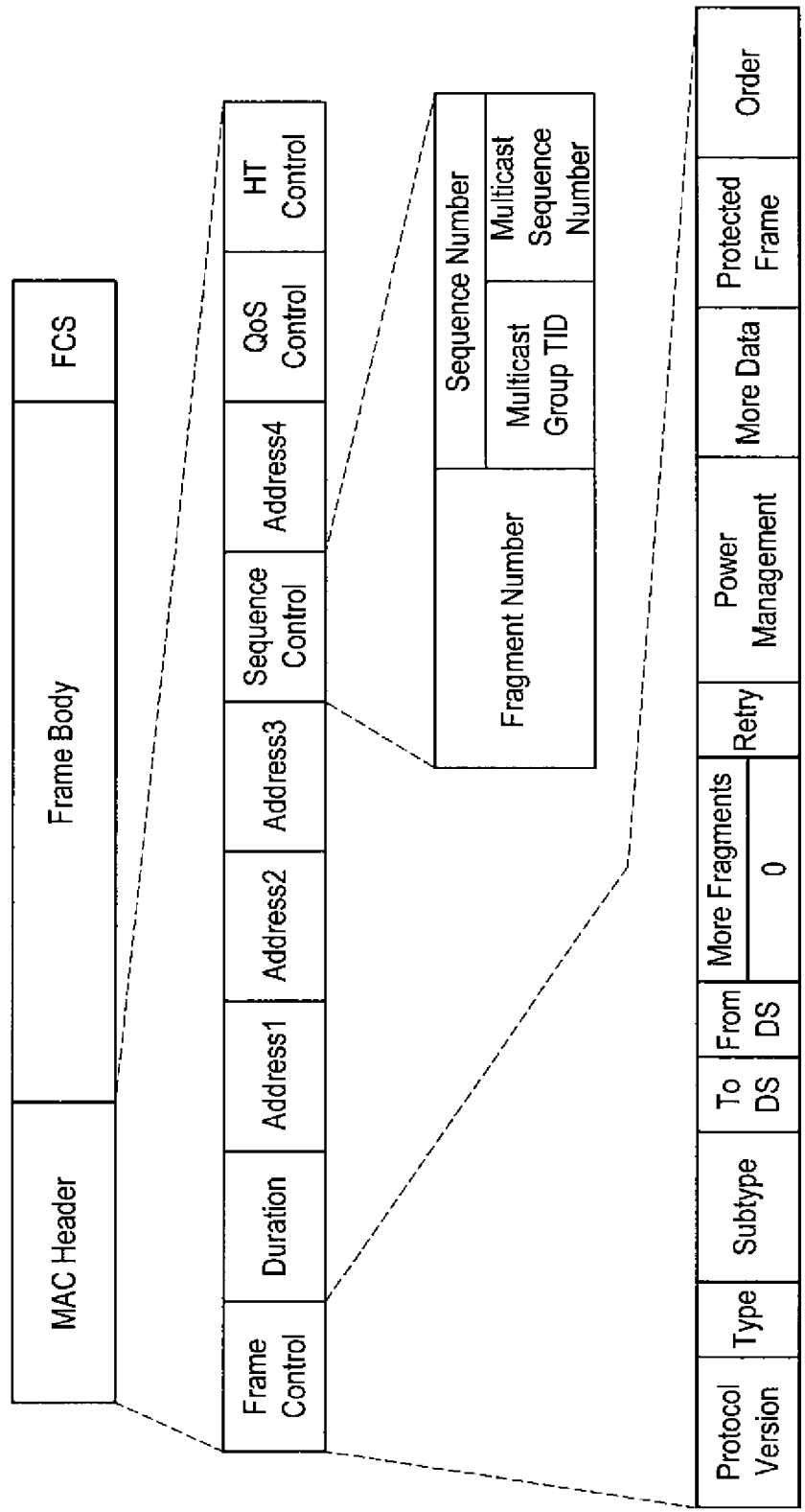
FIG. 7 is a diagram illustrating another example of a format of a first PDU transmitted by a transmission device according to one embodiment of the present disclosure.

The transmission device 100 transmits a PDU including the multicast-related information. Specifically, the data processing unit 110 generates a PDU including the sequence number information set for each multicast group, the multicast group information, and the data unit (hereinafter also referred to as a "first PDU"). Then, the wireless communication unit 130 transmits the generated first PDU. Further, a format of the first PDU transmitted by the transmission device 100 will be described in detail with reference to FIGS. 6 and 7. FIG. 6 is a diagram illustrating an example of the format of the first PDU transmitted by the transmission device 100 according to one embodiment of the present disclosure. Further, FIG. 7 is a diagram illustrating another example of the format of the first PDU transmitted by the transmission device 100 according to one embodiment of the present disclosure.

The first PDU includes the multicast data frame or the broadcast frame. For example, the multicast data frame or the broadcast frame has fields such as MAC Header, Frame Body, and Frame Check Sequence (FCS) as a MAC PDU (MPDU) as illustrated in FIG. 6. The MAC Header field has fields such as Frame Control, Duration, Addresses 1 to 4, Sequence Control, Quality of Service (QoS) Control, and High Throughput (HT) Control. The Sequence Control field has fields such as Fragment Number and Sequence Number. The multicast group TID serving as the multicast group information is stored in the Fragment Number field. Further, a sequence number set for each multicast group is stored in the Sequence Number field.

Here, in the related art, frames are not divided (fragmented) in the multicast communication and the broadcast communication. Therefore, in the multicast communication and the broadcast communication, a field in which division information for the PDU such as the fragment number field is stored is a redundant field. On the other hand, when the multicast group information is stored in the Fragment Number field, it is possible to use the existing frame format and to effectively use the redundant fields.

Further, depending on the utilization of the field in which the division information is stored, predetermined information is stored in the field associated with the field in which the division information is stored. For example, as illustrated in FIG. 6, the Frame Control field includes fields such as Protocol Version, Type, Subtype, To Distribution System (DS), From DS, More Fragments, Retry, Power Management, More Data, Protected Frame, and Order. 0 indicating that the frame is not fragmented is stored in the More Fragments field in which the bit information is stored.

Further, the format of the first PDU is not limited to the above example. For example, the multicast group TID may be stored in the Sequence Number field together with the sequence number as illustrated in FIG. 7. In this case, when the Fragment Number field is dealt with similarly to the multicast frame or the broadcast frame of the related art, it is possible to reduce the influence caused by a change in a process on the field as compared with the case in which the multicast frame TID is stored in the fragment number.

(A-3. Release of Multicast-Related Information)

If a notification indicating the end of the multicast communication is given, the transmission device 100 releases the multicast-related information. Specifically, if a notification indicating the end of the multicast communication is given from the communication upper layer, the control unit 120 selects the multicast group related to the multicast communication to be ended on the basis of the notification. Then, the control unit 120 releases the multicast group TID corresponding to the selected multicast group and the sequence number for the multicast group TID. Further, in a case in which data related to the multicast group is stored in the transmission buffer 112, the control unit 120 discards the data from the transmission buffer 112.

(B. Reception Device)

Next, functions of the reception device 200 will be described.

(B-1. Setting of Multicast-Related Information)

The reception device 200 sets the multicast-related information in a case in which the multicast communication is requested. Specifically, if the multicast communication is requested from the communication upper layer, the control unit 220 sets the multicast group information and the sequence number for the multicast group information. Since the details are the same as in the setting of the multicast group information and the sequence number information in the transmission device 100, description thereof is omitted. Further, the control unit 220 sets the multicast group information shared with the transmission device 100 before the start of the multicast communication. Specifically, before the start of multicast communication, a frame having the set multicast group information is received, and the control unit 220 sets the multicast group information included in the frame. For example, in a case in which a video delivery service or the like using the multicast communication is provided from the server acting as the transmission device 100, the client operating as the reception device 200 requests the specific video delivery service. The client sets the notified multicast group information when the notification indicating the approval for the request for the specific video delivery service is given from the server.

(B-2. Reception of PDU)

The reception device 200 receives the first PDU described above. Specifically, the wireless communication unit 230 receives at least a part of the first PDU including the sequence number information set for each multicast group, the multicast group information, and the data unit. For example, the wireless communication unit 230 receives the entire MPDU as described above.

Then, the data processing unit 210 acquires the data unit from the received first PDU on the basis of the sequence number information and the multicast group information stored in at least a part of the first PDU received by the wireless communication unit 230. For example, the data processing unit 210 acquires the multicast group TID stored in the Fragment Number field in the header of the received MPDU and the sequence number stored in the Sequence Number field. Then, the data processing unit 210 determines whether or not the sequence number managed by the control unit 220 for the multicast group TID corresponding to the acquired multicast group TID coincides with the acquired sequence number. In a case in which the sequence numbers coincide with each other, the data processing unit 210 does not acquire the data unit stored in the payload, that is, the Frame Body field of the MPDU, since the MPDU is considered to have been received in duplicate. Conversely, in a case in which the sequence numbers do not coincide with each other, the data processing unit 210 acquires the data unit from the Frame Body field of the MPDU. Further, if the data unit is acquired, the sequence number for the multicast group TID related to the data unit is stored in a storage unit (not illustrated). Further, the data unit may be acquired further on the basis of a determination of whether or not the multicast group address of the multicast group to which the reception device belongs coincides with a destination address.

Then, the acquired data unit, that is, data, is stored in the reception buffer 215 in a state in which the multicast group TID can be distinguished. For example, a region of the reception buffer 215 may be set for each multicast group TID, and data for each multicast group TID may be stored in a region corresponding to each multicast group TID. Further, the reception buffer 215 may be installed for each multicast group TID.

(B-3. Output of Data)

The reception device 200 outputs the received data to the communication upper layer. Specifically, the data processing unit 210 outputs the data stored in the reception buffer 215 at a predetermined timing. For example, a series of data stored for each multicast group TID is output via the interface unit 211.

(B-4. Release of Multicast-Related Information)

If the notification indicating the end of the multicast communication is received, the reception device 200 releases the multicast-related information. Specifically, if the notification indicating the end of the multicast communication is received from the communication upper layer, the control unit 220 releases the multicast group TID corresponding to the multicast group selected on the basis of the notification and the sequence number for the multicast group TID. Further, in a case in which the data related to the multicast group is stored in the reception buffer 215, the control unit 220 discards the data from the reception buffer 215.

1-4. Process of Communication Device

Next, processes of the transmission device 100 and the reception device 200 will be described.

(Process of Transmission Device)

Figure 8:
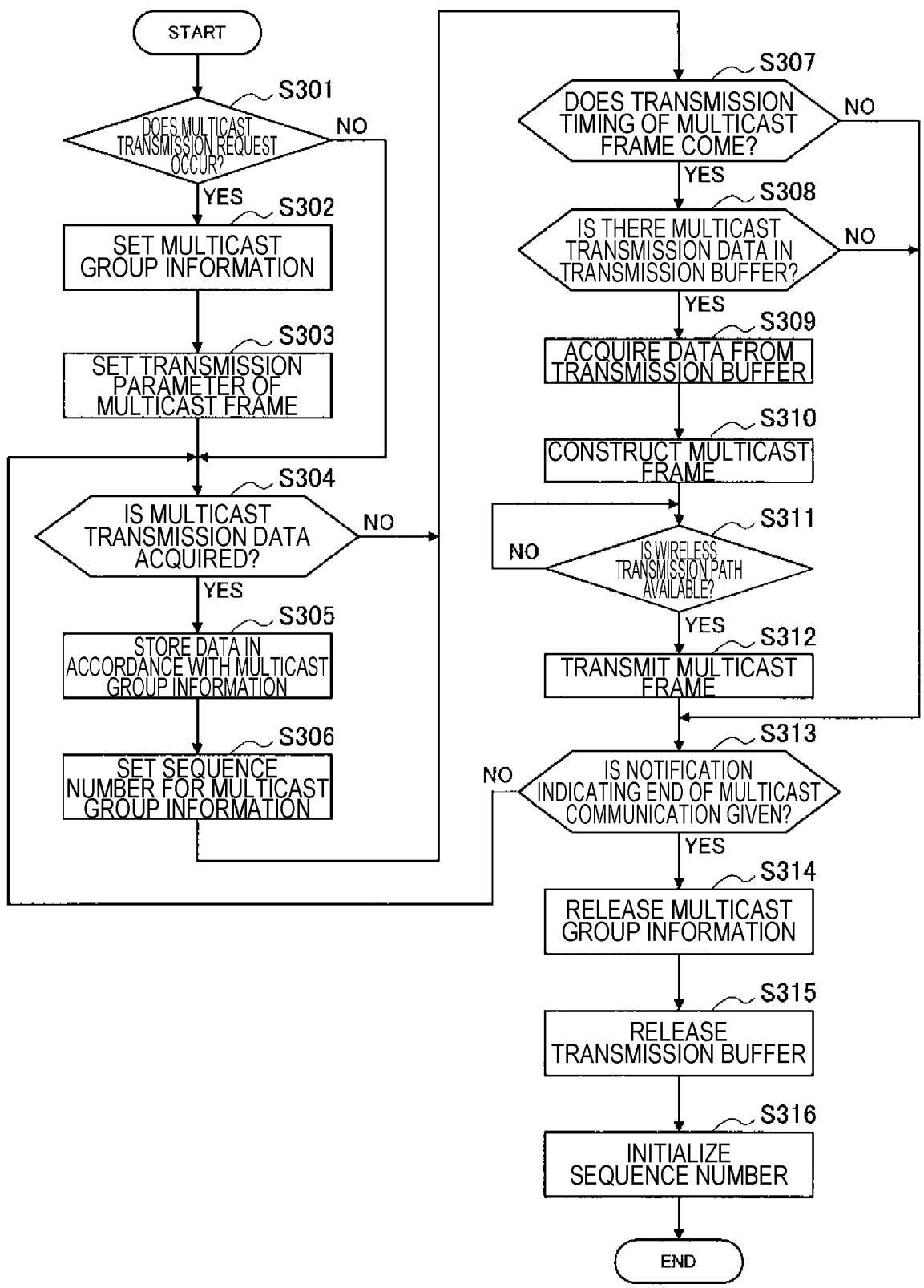
FIG. 8 is a flowchart conceptually illustrating an example of processing performed by a transmission device according to the embodiment of the present disclosure.

First, a process of the transmission device 100 will be described with reference to FIG. 8. FIG. 8 is a flowchart conceptually illustrating an example of a process of the transmission device 100 according to one embodiment of the present disclosure.

The transmission device 100 determines whether or not a multicast transmission request occurs (step S301). Specifically, the control unit 120 determines whether or not a notification of the multicast transmission request is given from the communication upper layer.

If it is determined that the multicast transmission request occurs, the transmission device 100 sets the multicast group information (step S302). Specifically, if it is determined that the notification of the multicast transmission request is given, the control unit 120 sets the multicast group and the multicast group TID corresponding to the multicast group. Then, the control unit 120 initializes the sequence counter for the set multicast group TID.

Then, the transmission device 100 sets the transmission parameter of the multicast frame (step S303). Specifically, the control unit 120 sets a parameter such as a transmission timing of the multicast frame related to the set multicast group TID.

Then, the transmission device 100 determines whether or not multicast transmission data is acquired (step S304). Specifically, the data processing unit 110 determines whether or not data transmitted in a multicast manner is acquired via the interface unit 111.

If it is determined that the multicast transmission data is acquired, the transmission device 100 stores the acquired data in the transmission buffer 112 in accordance with the multicast group information (step S305). Specifically, if it is determined that the data transmitted in a multicast manner is acquired, the data processing unit 110 stores the acquired data in a region allocated to the multicast group TID related to the data in the transmission buffer 112.

Then, the transmission device 100 sets the sequence number for the multicast group information (step S306). Specifically, if the data is stored in the transmission buffer 112, the control unit 120 counts up a value of the sequence counter for the multicast group TID related to the data.

Then, the transmission device 100 determines whether or not the transmission timing of the multicast frame comes (step S307). Specifically, the control unit 120 determines whether or not the transmission timing of the set multicast frame comes.

If it is determined that the transmission timing of the multicast frame comes, the transmission device 100 determines whether or not there is multicast transmission data in the transmission buffer 112 (step S308). Specifically, if it is determined that the transmission timing of the multicast frame comes, the control unit 120 causes the data processing unit 110 to determine whether or not data to be transmitted in a multicast manner is stored in the transmission buffer 112.

If it is determined that there is multicast transmission data in the transmission buffer 112, the transmission device 100 acquires the multicast transmission data from the transmission buffer 112 (step S309). Specifically, if it is determined that data to be transmitted in a multicast manner is stored in the transmission buffer 112, the data processing unit 110 acquires the data from the transmission buffer 112.

Then, the transmission device 100 constructs a multicast frame (step S310). Specifically, the data processing unit 210 includes a multicast data frame including a header storing the sequence number of the data and the multicast group TID related to the data and a frame body storing the data acquired from the transmission buffer 112.

Then, the transmission device 100 determines whether or not a wireless transmission path is available (step S311). Specifically, the wireless communication unit 130 determines whether or not the wireless transmission path is empty using carrier sensing or the like.

If it is determined that the wireless transmission path is available, the transmission device 100 transmits the multicast frame (step S312). Specifically, the wireless communication unit 130 transmits the generated multicast data frame.

Then, the transmission device 100 determines whether or not the notification indicating the end of the multicast communication is given (step S313). Specifically, the control unit 120 determines whether or not the notification indicating the end of the multicast communication related to the multicast group TID being set is given from the communication upper layer.

If it is determined that the notification indicating the end of the multicast communication is given, the transmission device 100 releases the multicast group information related to the notification (step S314). Specifically, if it is determined that the notification indicating the end of the multicast communication related to the multicast group TID being set is given, the control unit 120 releases the multicast group TID by canceling a correspondence between the multicast group TID being set and the multicast group. Further, the multicast group address corresponding to the multicast group TID is also released.

Further, the transmission device 100 releases the transmission buffer 112 for the multicast group information related to the notification (step S315). Specifically, the control unit 120 causes the data processing unit 110 to release the region of the transmission buffer 112 secured for the released multicast group TID.

Further, the transmission device 100 initializes the sequence number for the multicast group information related to the notification (step S316). Specifically, the control unit 120 initializes a count value of the sequence counter for the released multicast group TID.

(Process of Transmission Device)

Figure 9:
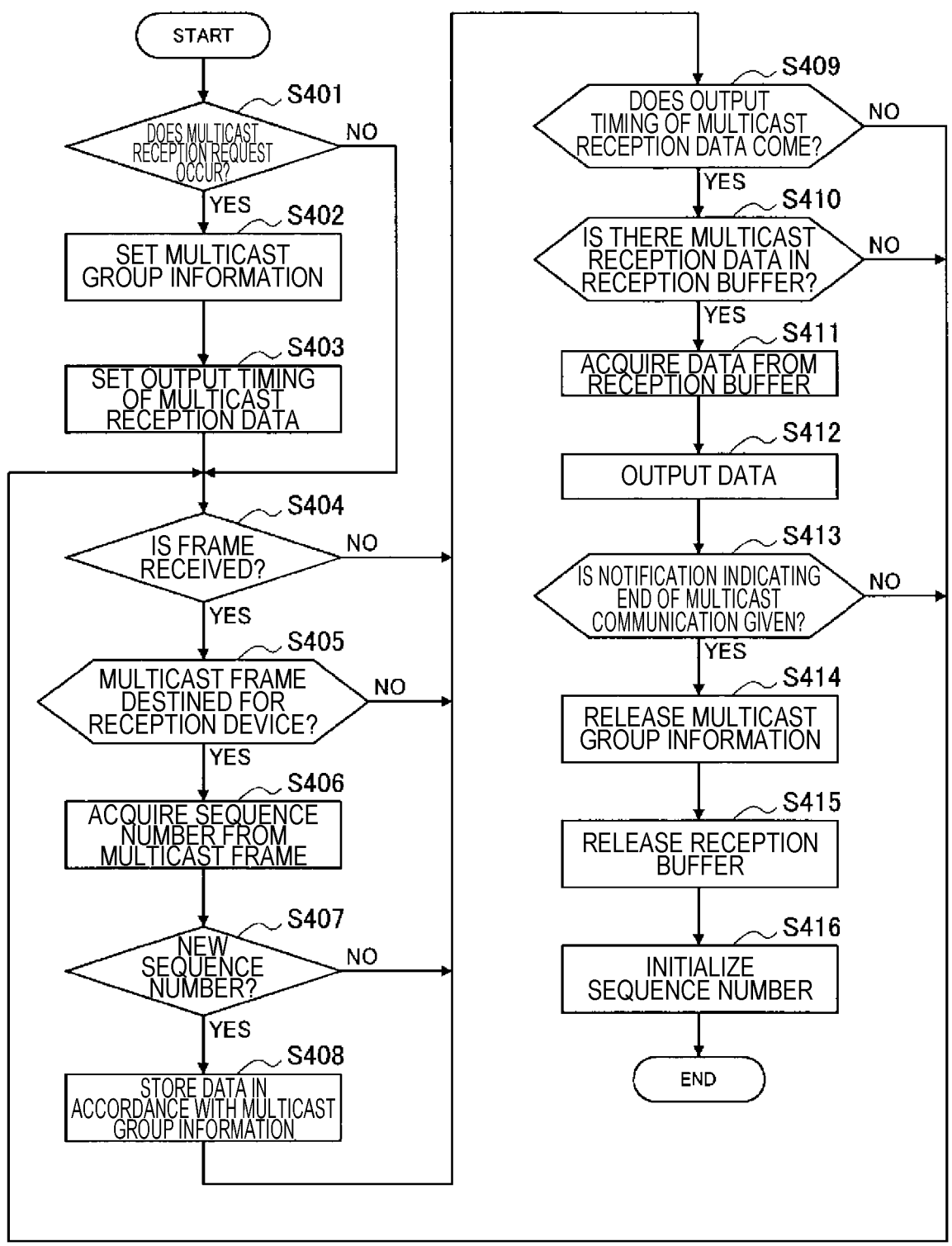
FIG. 9 is a flowchart conceptually illustrating an example of processing performed by a reception device according to the embodiment of the present disclosure.

Next, a process of the reception device 200 will be described with reference to FIG. 9. FIG. 9 is a flowchart conceptually illustrating an example of a process of the reception device 200 according to one embodiment of the present disclosure.

The reception device 200 determines whether or not a multicast reception request occurs (step S401). Specifically, the control unit 220 determines whether or not a notification of the multicast reception request is given from the communication upper layer.

If it is determined that the multicast reception request occurs, the reception device 200 sets the multicast group information (step S402). Specifically, if it is determined that the notification of the multicast reception request is given, the control unit 220 sets the multicast group and the multicast group TID corresponding to the multicast group. Then, the control unit 220 initializes a storage region of the sequence number for the set multicast group TID.

Then, the reception device 200 sets an output timing of multicast reception data (step S403). Specifically, the control unit 220 sets an output timing of data received by multicast communication using the set multicast group TID.

Then, the reception device 200 determines whether or not a frame is received (step S404). Specifically, the data processing unit 210 determines whether or not a frame is received from the transmission device 100 through the wireless communication unit 230.

If it is determined that a frame is received, the reception device 200 determines whether or not the frame is a multicast frame destined for the reception device 200 (step S405). Specifically, if it is determined that a frame is received, the data processing unit 210 acquires the multicast group TID from the header of the received frame. Then, the data processing unit 210 determines whether or not the acquired multicast group TID coincides with any one of the multicast group TIDs set in the reception device 200.

If it is determined that the received frame is a multicast frame destined for the reception device 200, the reception device 200 acquires the sequence number from the multicast frame (step S406). Specifically, if it is determined that the multicast group TIDs coincide with each other, the data processing unit 210 acquires the sequence number from the header of the received multicast frame.

Then, the reception device 200 determines whether or not the acquired sequence number is a new sequence number (step S407). Specifically, the data processing unit 210 determines whether or not the acquired sequence number coincides with one of the sequence numbers for the acquired multicast group TIDs stored in the reception device 200.

If it is determined that the acquired sequence number is a new sequence number, the reception device 200 stores the data stored in the received multicast frame in the reception buffer 215 in accordance with the multicast group information (step S408). Specifically, if it is determined that the sequence numbers do not coincide with each other, the data processing unit 210 acquires the multicast group address from the multicast frame. Then, in a case in which the acquired multicast group address coincides with the multicast group address to which the reception device 200 belongs, the data processing unit 210 acquires data from the frame body of the multicast frame. Then, the data processing unit 210 stores the acquired data in a region corresponding to the acquired multicast group TID in the reception buffer 215. Further, the example in which it is determined whether or not the multicast group addresses coincide with each other after it is determined whether or not the sequence numbers are duplicated as specified in the existing standard has been described above. Here, in the process of determining whether or not the received frame is a multicast frame destined for the reception device (step S405), it may be determined whether or not the multicast group addresses coincide with each other.

Then, the reception device 200 determines whether or not the output timing of the multicast reception data comes (step S409). Specifically, the control unit 220 determines whether or not the output timing of the data received by the multicast communication using the set multicast TID comes.

If it is determined that the output timing of the multicast reception data comes, the reception device 200 determines whether or not there is multicast reception data in the reception buffer 215 (step S410). Specifically, if it is determined that the output timing of the data received by the multicast communication comes, the control unit 220 determines whether or not data is stored in a region corresponding to the multicast group TID in the reception buffer 215 using the data processing unit 210.

If it is determined that there is multicast reception data in the reception buffer 215, the reception device 200 acquires the multicast reception data from the reception buffer 215 (step S411). Specifically, if it is determined that data is stored in the corresponding region of the reception buffer 215, the data processing unit 210 acquires a series of data stored in the region. Further, the number of data stored in the reception buffer 215 may be one.

Then, the reception device 200 outputs the acquired data (step S412). Specifically, the data processing unit 210 outputs the acquired series of data to the communication upper layer via the interface unit 111.

Then, the reception device 200 determines whether or not the notification indicating the end of the multicast communication is given (step S413). Specifically, the control unit 220 determines whether or not the notification indicating the end of the multicast communication related to the multicast group TID being set is given from the communication upper layer.

If it is determined that the notification indicating the end of the multicast communication is given, the reception device 200 releases the multicast group information related to the notification (step S414). Specifically, if it is determined that the notification indicating the end of the multicast communication related to the multicast group TID being set is given, the control unit 220 releases the multicast group TID by canceling a correspondence between the multicast group TID being set and the multicast group. Further, the multicast group address corresponding to the multicast group TID is released.

Further, the reception device 200 releases the reception buffer 215 for the multicast group information related to the notification (step S415). Specifically, the control unit 220 causes the data processing unit 210 to release the region of the reception buffer 215 secured for the released multicast group TID.

Further, the reception device 200 initializes the sequence number for the multicast group information related to the notification (step S416). Specifically, the control unit 220 deletes the sequence number related to the received data for the released multicast group TID from the storage unit.

<1-5. Operation Example of Communication System>

Figure 10A:
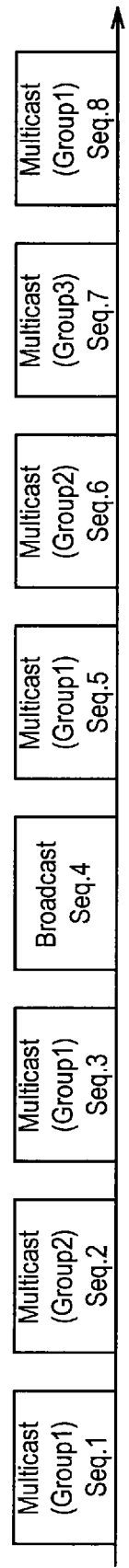
FIG. 10A is a diagram for describing an example of communication between a transmission device and a reception device according to a related art.
Figure 10B:
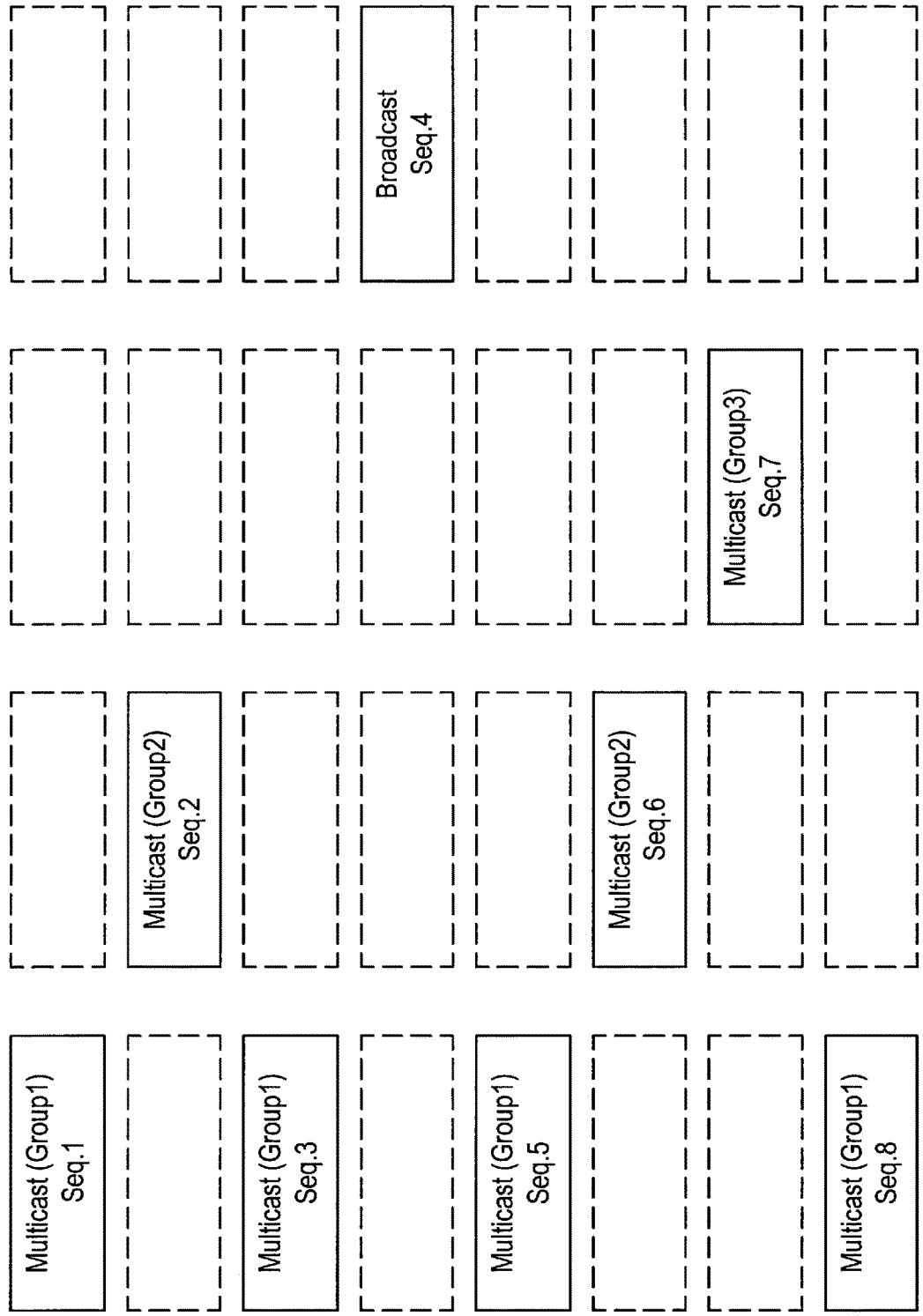
FIG. 10B is a diagram for describing an example of communication between a transmission device and a reception device according to a related art.
Figure 11A:
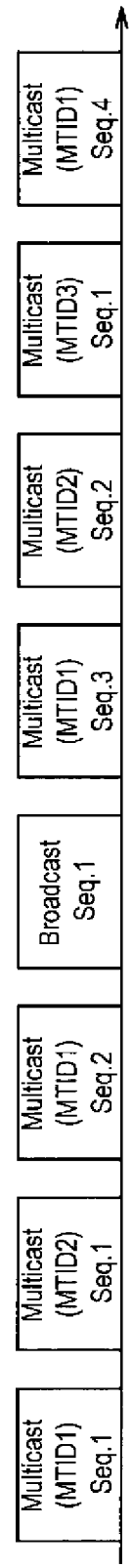
FIG. 11A is a diagram for describing an example of communication between a transmission device and a reception device according to one embodiment of the present disclosure.
Figure 11B:
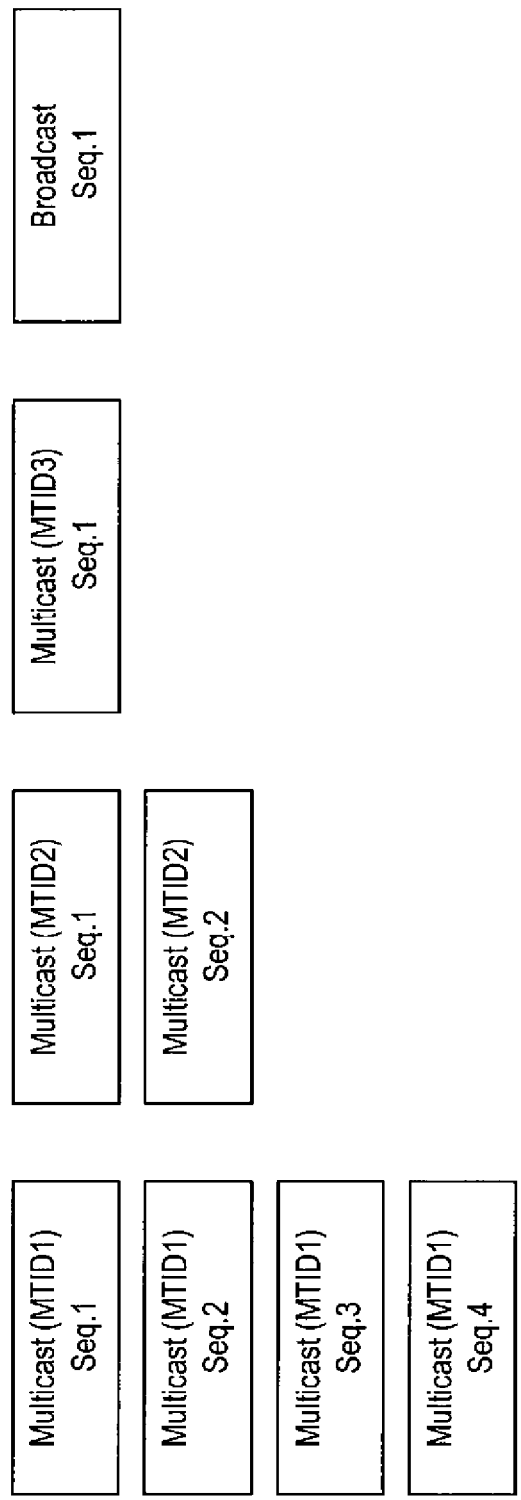
FIG. 11B is a diagram for describing an example of communication between a transmission device and a reception device according to one embodiment of the present disclosure.

The processes of the transmission device 100 and the reception device 200 according to one embodiment of the present disclosure has been described above. Next, an operation example of the transmission device 100 and the reception device 200 will be described after comparison with an operation example of the transmission device 10 and reception device 20 of the related art. FIGS. 10A and 10B are diagrams for describing an example of communication between the transmission device 10 and reception device 20 of the related art. FIGS. 11A and 11B are diagrams for describing an example of communication between the transmission device 100 and the reception device 200 according to one embodiment of the present disclosure.

(Operation Example of Communication Device of Related Art)

First, an example of communication between the transmission device 10 and reception device 20 of the related art will be described with reference to FIGS. 10A and 10B.

The transmission device 10 transmits the multicast frames and the broadcast frames destined for a plurality of multicast groups. For example, as illustrated in FIG. 10A, the transmission device 10 transmits the multicast frames destined for three multicast groups of Group 1 to Group 3, and transmits the broadcast frame between the transmissions of the multicast frames. In the transmission device 10, since the sequence numbers (that is, the sequence counters) are shared by the multicast communication and the broadcast communication, the sequence numbers of the respective frames to be transmitted are continuous.

However, in the reception device 20 that has received multicast frames, the sequence numbers are discontinuous between the received frames. For example, as illustrated in FIG. 10B, the reception device 20 belonging to the multicast group Group 1 receives the multicast frames having sequence numbers 1, 3, 5, and 8. On the other hand, the multicast frames having sequence numbers 2, 6, and 7 are destined for the multicast groups Group 2 and Group 3 to which the reception device 20 does not belong and thus not received by the reception device 20. Further, there are cases in which the broadcast frame having the sequence number 4 is not received. Therefore, the sequence numbers of the data stored in the reception buffer 215 of the reception device 20 is 1, 3, 5, and 8 (1, 3 to 5, and 8 in a case in which the broadcast frame is received) and is discontinuous.

As described above, in the reception device 20, there are cases in which the sequence numbers are discontinuous. For this reason, the reception device 20 is caused to stand by until a frame related to data of a missing sequence number is received. As a result, the communication efficiency is likely to decrease as described above.

Operation Example of Communication Device According to One Embodiment of Present Disclosure Next, an example of communication between the transmission device 100 and the reception device 200 according to one embodiment of the present disclosure will be described with reference to FIGS. 11A and 11B.

The transmission device 100 transmits the multicast frames and the broadcast frames destined for a plurality of multicast groups. For example, as illustrated in 11A, the transmission device 100 transmits the multicast frame having multicast group TIDs 1 to MTID 3 (hereinafter also referred to as "MTIDs") corresponding to three multicast groups of Group 1 to Group 3, and transmits the multicast frame between the transmissions of the broadcast frames. In the transmission device 100, the sequence number (that is, the sequence counter) is set for each MTID. Therefore, the sequence numbers are 1 to 4 for the same MTID, for example, MTID 1 and are continuous. Further, since the sequence numbers are managed independently for the broadcast communication, the sequence number related to the broadcast frame is 1.

Therefore, in the reception device 200, the sequence numbers related to the received multicast frames are continuous. For example, in a case in which MTID 1 is set to the multicast group Group 1, the reception device 200 belonging to the multicast group Group 1 receives the multicast frames for MTID 1 having sequence numbers 1 to 4 as illustrated in FIG. 11B. On the other hand, since other multicast frames have MTID 2 or MTID 3, they are not received by the reception device 200. Further, even in a case in which the broadcast frame is received, the sequence numbers are managed individually for the broadcast communication, and it is determined not to overlap with the sequence number for MTID 1. Therefore, the sequence numbers related to the multicast frame received by the reception device 200 are 1 to 4 and are continuous.

As described above, in the reception device 200, the sequence numbers are continuous. For this reason, the reception device 20 can suppress the deterioration of the communication efficiency described above without standing by till retransmission of the frame. Further, even in a case in which the reception device 200 belongs to a plurality of multicast groups, the sequence numbers are managed independently in each multicast group, and thus it is possible to manage each of the sequence numbers in the multicast communication, substantially similarly to the management of the sequence numbers in the unicast communication. Therefore, since the sequence numbers are not discontinuous or overlap, it is possible to suppress the decrease in the communication efficiency or the occurrence of communication failure.

1-6. Conclusion of One Embodiment of Present Disclosure

As described above, according to one embodiment of the present disclosure, the transmission device 100 generates the first PDU including the first sequence number information specifying the first sequence number of the data unit set for each multicast group, the multicast group information specifying the multicast group, and the data unit. Then, the transmission device 100 transmits the generated first PDU. Further, the reception device 200 receives at least a part of the first PDU and acquires the data unit from the first PDU on the basis of the first sequence number information and the multicast group information stored in at least a part of the received first PDU.

In the related art, in a case in which frames destined for a plurality of multicast groups are communicated, the sequence numbers are managed in common for the plurality of multicast groups. For this reason, in the reception device which receives only frames destined for the multicast group to which the reception device belongs, the sequence numbers are discontinuous. As a result, the reception device stands by until the frame related to the missing sequence number which is not received is received, and the communication efficiency may decrease.

On the other hand, according to the transmission device 100 and the reception device 200, since the sequence number is set for each multicast group, it is possible to prevent the sequence numbers related to the multicast frame from becoming discontinuous even though all the multicast frames are successfully received in the reception device 200. Therefore, since standing by until the frame which is not transmitted is received is prevented while securing the region of the reception buffer 215, even in a case in which a plurality of types of multicast communication which differ in the multicast group serving as the destination are performed, it is possible to improve the efficiency of the wireless communication.

Further, the sequence number information and the multicast group information are stored in the header of the first PDU. Here, the existing sequence number is stored in the header, and the frame duplication determination process using the existing sequence numbers is performed in the process for the header. Therefore, the sequence number information and the multicast group information are stored in the header, and thus it is possible to perform the reception process using the existing header process. Thus, it is possible to facilitate a change from the communication device of the related art to the communication device according to one embodiment of the present disclosure.

Further, the multicast group information further includes the information specifying the communication scheme other than the multicast communication. Therefore, it is possible to specify a communication method other than the multicast communication in addition to the multicast group with reference to only the multicast group information. Therefore, by using the multicast group information, it is possible to manage the sequence numbers for a plurality of communication methods collectively.

Further, the communication scheme other than the multicast communication includes the broadcast communication. The transmission device 100 generates a second PDU including second sequence number information specifying a second sequence number set for a data unit to be broadcast, multicast group information specifying the broadcast communication, and a data unit. Then, the transmission device 100 transmits the generated second PDU. Here, as described above, it is rare for the broadcast frame to be retransmitted. Therefore, if the sequence number related to the broadcast frame is missing and the sequence numbers are discontinuous, the reception device stands by until a timeout occurs. On the other hand, in the communication device according to one embodiment of the present disclosure, the multicast group information is allocated even to the broadcast communication. Accordingly, even when the reception of the broadcast frame fails and the sequence number is missing in the multicast group information for the broadcast communication, it is possible to detect that the frame related to the missing sequence number is the broadcast frame. Therefore, it is possible to prevent the retransmission of the broadcast frame from being on standby, and it is possible to further suppress the decrease in the communication efficiency.

Further, the multicast group information includes the multicast group information set for each piece of information specifying the communication purpose. Further, the information specifying the communication purpose includes the information specifying the type of communication traffic. Here, there are cases in which data related to the same communication purpose differs in the multicast group serving as the destination. On the other hand, in the related art, the sequence numbers are managed for each piece of information specifying the communication purpose, for example, each TID. On the other hand, according to the communication device according to one embodiment of the present disclosure, since the multicast group TID is set for each TID, it is possible to distinguish the multicast group even when the TID is identical. Therefore, even in a case in which the existing communication process is used, occurrence it is possible to prevent the discontinuity of the sequence numbers reliably.

Further, the multicast group information is stored in the field in which the division information for the first PDU is stored. In the related art, since the multicast frame is never divided (fragmented), the field in which the segmentation information is stored, that is, the fragment number field is used as a redundant field. On the other hand, according to the communication device according to one embodiment of the present disclosure, since the multicast group TID is stored in the Fragment Number field, it is possible to effectively utilize the redundant field, and separately, it is possible to prevent the increase in the communication volume caused by addition of the field. Further, it is possible to use the existing frame format without change, and it is possible to suppress an increase in influence caused by a change in the frame reception process.

Further, in a case in which the first sequence number specified from the first sequence number information does not coincide with the sequence number of the acquired data unit belonging to the multicast group specified from the multicast group information, the reception device 200 acquires the data unit stored in the first PDU. For this reason, it is possible to use the sequence numbers duplicated between different multicast groups by determining whether or not the sequence numbers are duplicated for each multicast group TID, that is, for each multicast group. In other words, the sequence number space can be made independent among the multicast groups. Therefore, the sequence number duplication determination process can be kept to substantially the same degree of complexity as in the process of the related art, and it is possible to suppress the sequence number duplication determination process from being complicated.

2. MODIFIED EXAMPLES

One embodiment of the present disclosure has been described above. Further, one embodiment of the present disclosure is not limited to the above example. Hereinafter, first to fourth modified examples of one embodiment of the present disclosure will be described.

First Modified Example

As a first modified example of the present disclosure, the transmission device 100 and the reception device 200 may communicate an acknowledge on the basis of the sequence number information managed for each piece of multicast group information. Specifically, the reception device 200 transmits a block acknowledge including the multicast group information and the sequence number information related to the data unit for the multicast group specified from the multicast group information. Further, the transmission device 100 receives the block acknowledge transmitted from the reception device 200.

More specifically, the transmission device 100 transmits a block acknowledge request including the multicast group information. For example, if the sequence number reaches an upper limit, the control unit 120 causes the data processing unit 110 to generate a BAR frame including a multicast group TID for the sequence number reaching the upper limit. Then, the wireless communication unit 130 transmits the generated BAR frame.

If the block acknowledge request transmitted from the transmission device 100 is received, the reception device 200 transmits the block acknowledge as a response to the block acknowledge request. For example, the wireless communication unit 230 receives the BAR frame transmitted from the transmission device 100. Then, the data processing unit 210 acquires the multicast group TID from the received BAR frame. Then, the control unit 220 acquires the sequence number of the stored received data for the acquired multicast group TID, and causes the data processing unit 210 to generate the BA frame including information specifying the acquired sequence number (for example, bitmap information). Then, the wireless communication unit 230 transmits the generated BA frame.

Then, the transmission device 100 receives the block acknowledge as the response to the block acknowledge request, and retransmits the frame in some cases. For example, the wireless communication unit 130 receives the BA frame from the reception device 200. Then, the data processing unit 110 acquires the bitmap information from the received BA frame. Then, the control unit 120 determines whether or not there is data to be retransmitted from the acquired bitmap information. In a case in which there is data to be retransmitted, the control unit 120 specifies the data, and causes the data processing unit 110 to generate a frame including data to be specified, a sequence number of the specified data, and a multicast group TID. Then, the wireless communication unit 130 transmits the generated frame.

Figure 12:
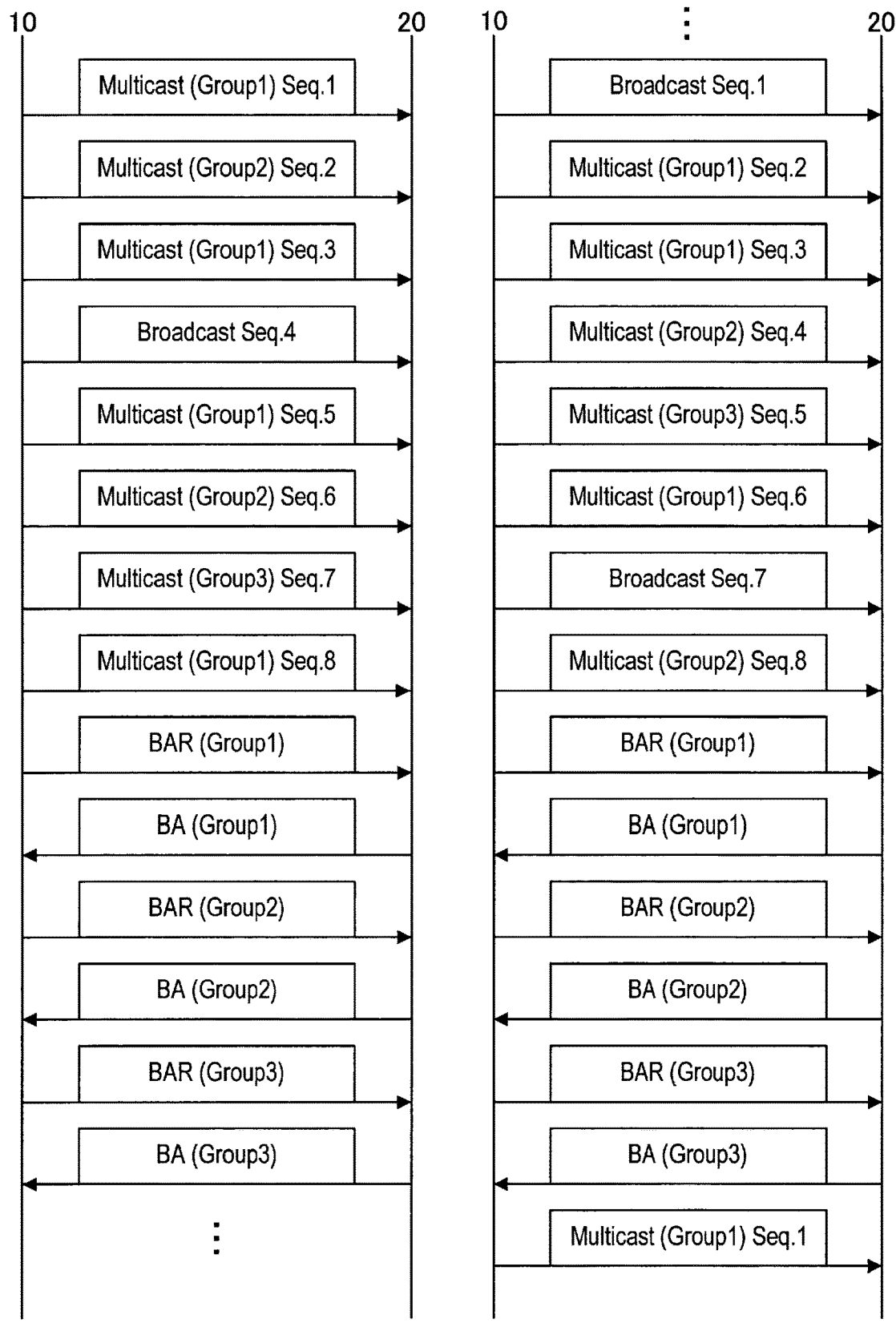
FIG. 12 is a diagram for describing an example of communication between a transmission device and a reception device according to a related art.
Figure 13:
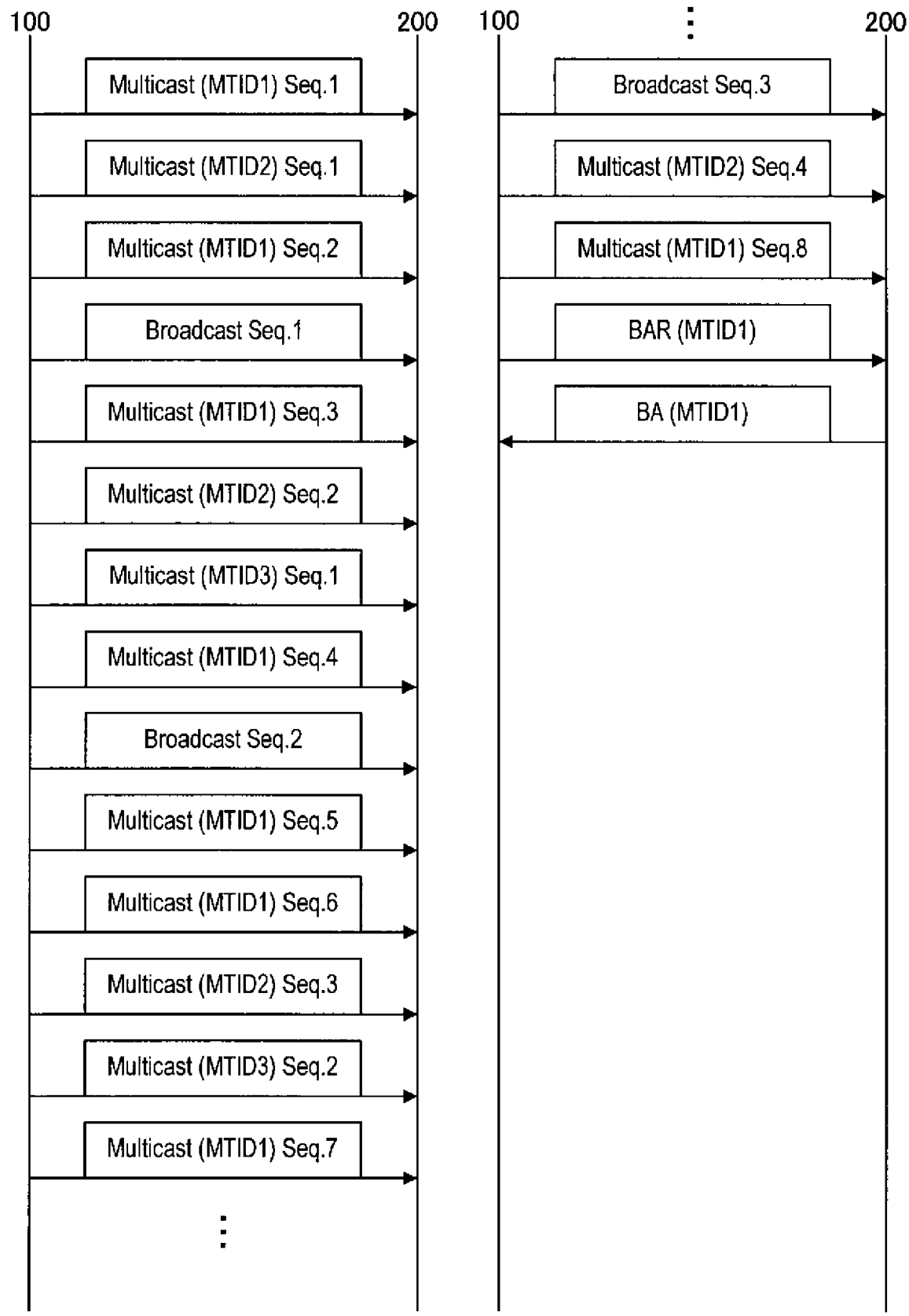
FIG. 13 is a diagram for describing an example of communication between a transmission device and a reception device according to one embodiment of the present disclosure.

The processes of the transmission device 100 and the reception device 200 according to the first modified example have been described above. Next, an operation example of the transmission device 100 and the reception device 200 will be described after comparison with an operation example of the transmission device 10 and the reception device 20 of the related art. FIG. 12 is a diagram for describing an example of communication between the transmission device 10 and reception device 20 of the related art. FIG. 13 is a diagram for describing an example of communication between the transmission device 100 and the reception device 200 according to one embodiment of the present disclosure.

(Operation Example of Communication Device of Related Art)

First, an example of communication between the transmission device 10 and reception device 20 of the related art will be described with reference to FIG. 12. Further, in the following description, it is assumed that the upper limit of the sequence number is 8.

First, data communication is performed between the transmission device 10 and the reception device 20. For example, as illustrated in FIG. 12, the multicast frame destined for the multicast group Group 1, the multicast frame destined for the multicast group Group 2, and the multicast frame destined for the multicast group Group 1 are communicated. Then, after the broadcast frame is transmitted, the multicast frame destined for the multicast group Group 1, the multicast frame destined for the multicast group Group 2, and the multicast frame destined for the multicast group Group 3 are communicated. Then, if the multicast frame destined for the multicast group Group 1 is communicated as an eighth frame, the sequence number reaches the upper limit 8. This is because the sequence numbers are shared by the multicast communication and the broadcast communication.

The transmission device 10 transmits the BAR frame to each multicast group if the sequence number reaches the upper limit. For example, as illustrated in FIG. 12, the transmission device 10 transmits the BAR frame for each of the multicast groups Group 1 to Group 3.

The reception device 20 which has received the BAR frame transmits the BA frame for each multicast group. For example, the reception device 20 transmits the BA frame including bitmap information specifying the sequence number of data which is not received or received for the TID designated by the received BAR frame.

In a case in which the communication of the BA frame ends, and retransmission of all pieces of data does not occur, the sequence number is initialized, and the data communication is resumed. For example, as illustrated in FIG. 12, the broadcast frame and the two consecutive frames, that is, the multicast frame destined for the multicast group Group 1 and the multicast frame destined for the multicast group Group 2 are communicated. Then, the multicast frame destined for the multicast group Group 3, the multicast frame destined for the multicast group Group 1, and the broadcast frame are communicated. Then, if the multicast frame destined for the multicast group Group 2 is communicated as the eighth frame, the sequence number reaches the upper limit 8.

If the sequence number reaches the upper limit, the transmission device 10 transmits the BAR frame to each multicast group, similarly to the last time. Further, the reception device 20 that has received the BAR frame also transmits the BA frame for each multicast group, similarly to the last time. Further, the details are omitted.

Then, if the data communication is resumed, the multicast frame destined for the eighth multicast group Group 1 is received. Further, at this time point, only the four multicast frames destined for the multicast group Group 2 and the two multicast frames destined for the multicast group Group 3 are received. On the other hand, the BAR frame and the BA frame are exchanged twice.

As described above, in the related art, in a case in which multicast communication to a plurality of multicast groups is performed, the frequency of communication related to the block acknowledge with respect to the frequency of multicast data communication increases. Accordingly, the efficiency of the multicast data communication is likely to decrease.

Operation Example of Communication Device According to One Embodiment of Present Disclosure Then, an example of communication between the transmission device 100 and the reception device 200 according to the first modified example of one embodiment of the present disclosure will be described with reference to FIG. 13.

First, data communication is performed between the transmission device 100 and the reception device 200. For example, as illustrated in FIG. 13, a multicast frame having a multicast group TID 1, a multicast frame having an MTID 2, and a multicast frame having an MTID 1 are communicated. Then, after the broadcast frame is transmitted, the multicast frame having the MTID 1, the multicast frame having the MTID 2, and a multicast frame having an MTID 3 are communicated. Then, the multicast frame having the MTID 1 is communicated as an eighth frame.

Here, in the transmission device 100 and the reception device 200, the sequence number is managed for each MTID. Therefore, in a case in which the sequence number does not reach the upper limit for any MTID, the BAR frame and the BA frame are not exchanged, and the data communication is continued. For example, as illustrated in FIG. 13, the sequence number for the MTID 1 is 4 and does not reach the upper limit. Therefore, as the data communication is continued, the broadcast frame and the two consecutive frames, that is, the multicast frame having the MTID 1 and the multicast frame having the MTID 2 are communicated. Then, the multicast frame having the MTID 3, the multicast frame having the MTID 1, and the broadcast frame are communicated. Then, the multicast frame having the MTID 2 is communicated as a sixteenth frame.

If the sequence number reaches the upper limit for any MTID, the BAR frame and the BA frame are exchanged for the MTID for the sequence number that has reached the upper limit. For example, as illustrated in FIG. 13, if the multicast frame having the MTID 1 whose sequence number is the upper limit 8 is communicated, the BAR frame for the MTID 1 is transmitted from the transmission device 100. Then, the BA frame including the bitmap information specifying the sequence number of data which is not received or received for the MTID 1 and the MTID 1 is transmitted from the reception device 200.

As described above, according to the transmission device 100 and the reception device 200 according to the present modified example, the communication frequency for the acknowledge can be lowered as compared with the related art. Therefore, it is possible to suppress the decrease in the efficiency of the multicast data communication.

Further, the BAR frame may be transmitted when the sequence number reaches the upper limit as described above or may be transmitted when a predetermined time elapses after the sequence number reaches the upper limit.

As described above, according to the first modified example of one embodiment of the present disclosure, the reception device 200 transmits the block acknowledge including the multicast group information and the first sequence number information related to the data unit for the multicast group specified from the multicast group information. Further, the transmission device 100 receives the block acknowledge including the multicast group information and the first sequence number information related to the data unit for the multicast group specified from the multicast group information. Here, in the transmission device 100 and the reception device 200, since the sequence number is managed for each multicast group TID, it is possible to secure the sequence number space for each multicast group TID. Therefore, it is possible to perform the communication of the BA frame only for the multicast group TID for the sequence number which has reached the upper limit, and it is possible to decrease the communication frequency of the BA frame to be lower than in the related art. In other words, the efficiency of the multicast data communication can be improved. In particular, it is possible to suppress unnecessary communication of the BA frame for the multicast frame in which the communication frequency is lower than in communication of other frames.

Further, the transmission device 100 transmits the block acknowledge request including the multicast group information and receives the block acknowledge as the response to the block acknowledge request. Further, the reception device 200 receives the block acknowledge request including the multicast group information and transmits the block acknowledge as the response to the block acknowledge request. For this reason, since the BA frame is communicated in response to the request from the transmission device 100, it is possible to suppress a possibility of unnecessary communication of the BA frame. Therefore, it is possible to improve the efficiency in the communication of the BA frame.

Further, the example in which the BA frame is transmitted on the basis of the reception of the BAR frame has been described above, but the BA frame may be transmitted on the basis of the sequence number. Specifically, the reception device 200 transmits the block acknowledge if the sequence number of the acquired data unit reaches a limit of a range used as the sequence number. For example, in a case in which it is determined that the sequence number reaches the upper limit, the control unit 220 causes the data processing unit 210 to generate the BA frame for the multicast group TID for the sequence number that has reached the upper limit. Then, the wireless communication unit 230 transmits the generated BA frame.

In this case, the communication of the BAR frame can be omitted. Therefore, it is possible to improve the efficiency in the communication of the BA frame. Further, it is possible to further improve the efficiency of the multicast data communication accordingly.

Second Modified Example

Figure 14:
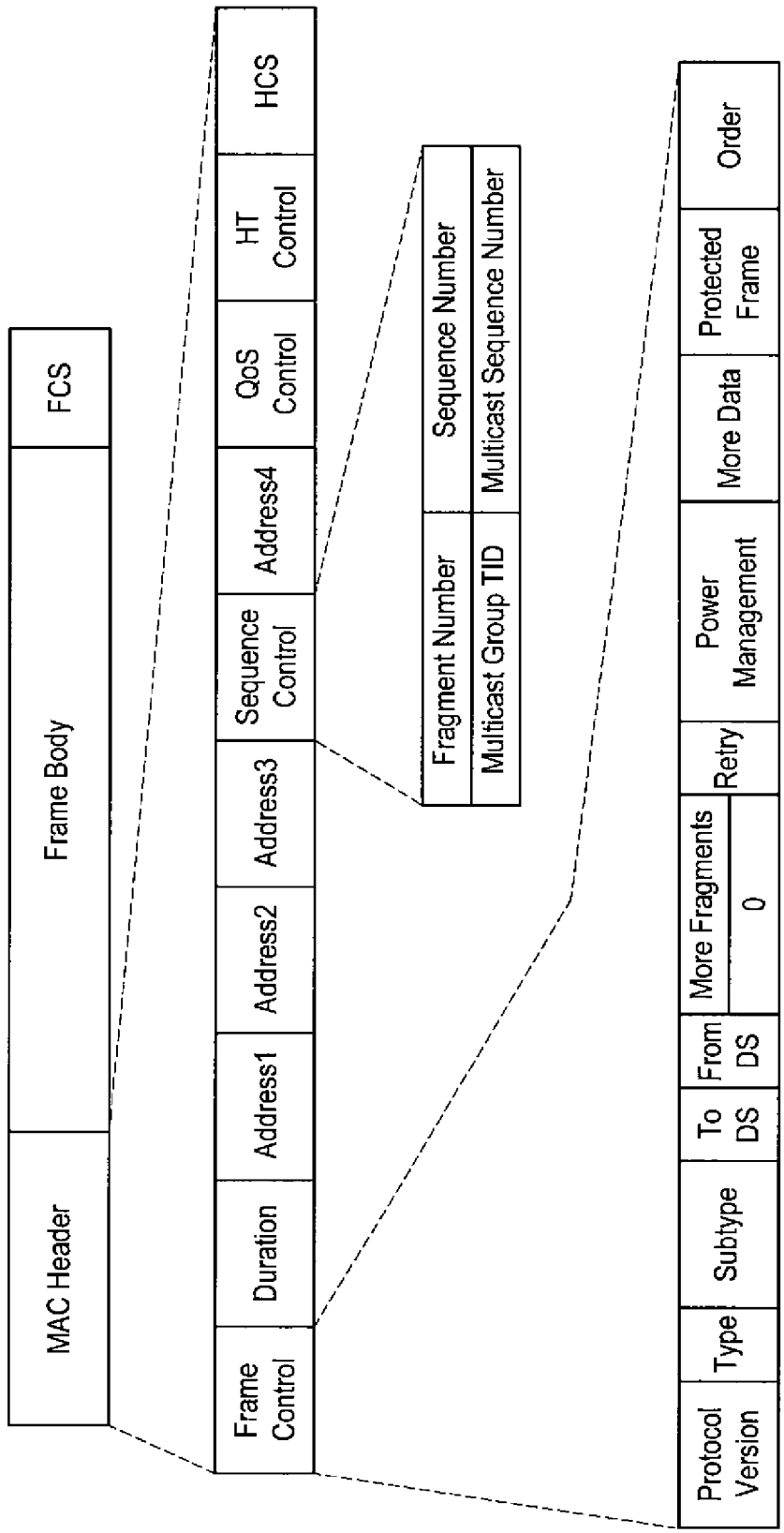
FIG. 14 is a diagram illustrating an example of a format of a first PDU transmitted by a transmission device according to a second modified example of one embodiment of the present disclosure.

As a second modified example of one embodiment of the disclosure, a header including the multicast group information may further include an error detection code. Specifically, the error detection code for the header is stored in the header including the multicast group information and the sequence number information, and the reception device 200 performs the reception process for the header using the error detection code for the header. Further, a process of the reception device 200 in the present modified example will be described in detail with reference to FIG. 14. FIG. 14 is a diagram illustrating an example of a format of the first PDU transmitted by the transmission device 100 according to the second modified example of one embodiment of the present disclosure.

As illustrated in FIG. 14, the first PDU according to the present modified example, for example, the MAC Header field included in the multicast frame has a Header Check Sequence (HCS) field in a tail. The error detection code is stored in the HCS field.

If the multicast frame of the format is transmitted, the reception device 200 first receives only the header of the multicast frame using the error detection code of the header. Then, the reception device 200 determines whether or not the frame body is received on the basis of the multicast group TID and the sequence number stored in the header of the received multicast frame. If it is determined that the frame body is received, the reception device 200 receives the frame body subsequent to the header and acquires data from the frame body.

As described above, according to the second modified example of one embodiment of the present disclosure, the header including the sequence number information and the multicast group information includes the error detection code. Therefore, the reception device 200 can cause the reception process for the first PDU to end only in the reception process for the header for the first PDU including no multicast group TID corresponding to the multicast group to which the reception device 200 belongs. Therefore, it is possible to reduce a load in the reception process for the first PDU.

Third Modified Example

Figure 15:
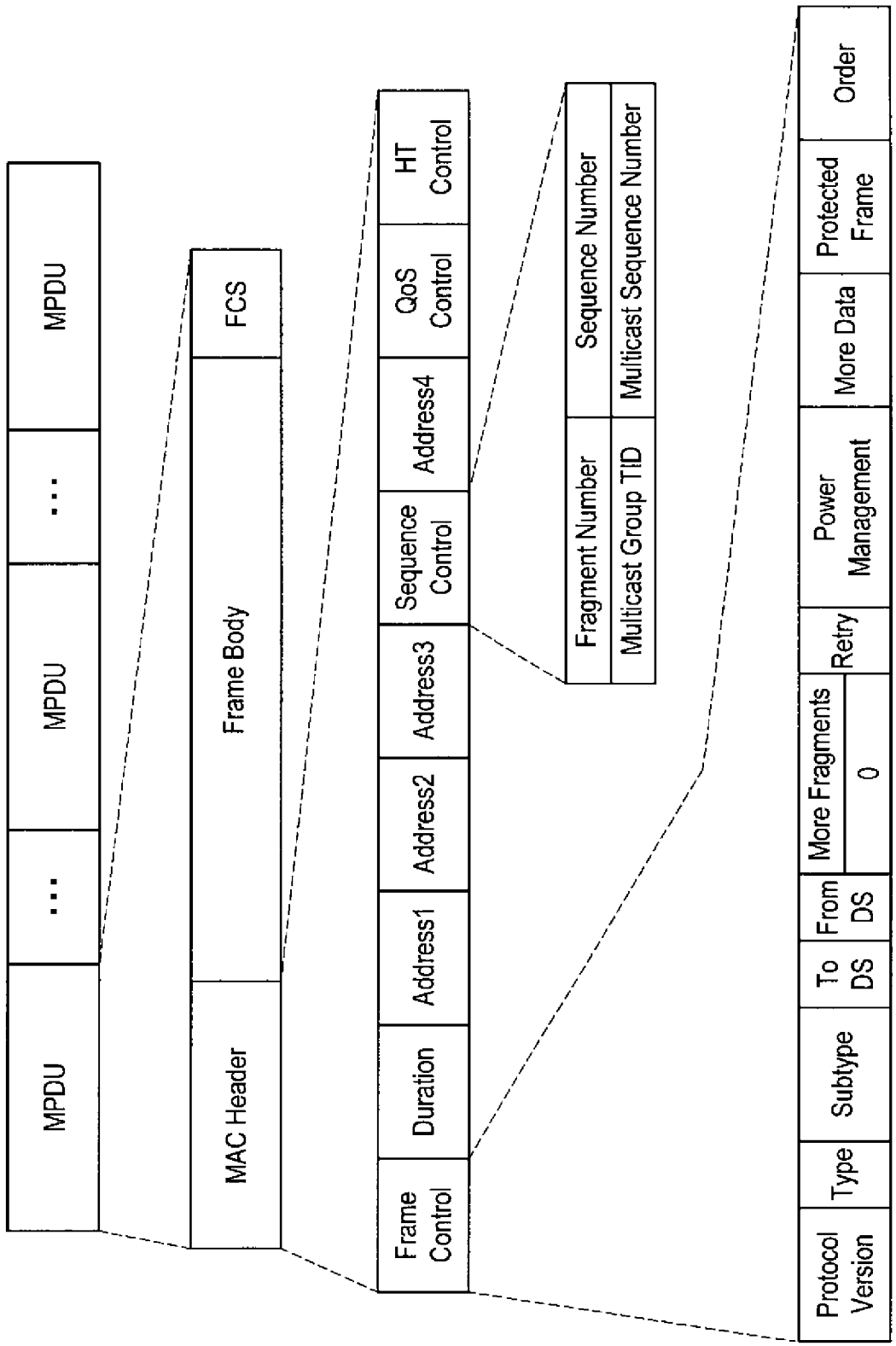
FIG. 15 is a diagram illustrating an example of a format of a first PDU transmitted by a transmission device according to a third modified example of one embodiment of the present disclosure.

As a third modified example of an embodiment of the present disclosure, the first PDU transmitted by the transmission device 100 may be a PDU related to a combination of a plurality of data units. Specifically, the first PDU transmitted by the transmission device 100 may be a subframe in an aggregation frame. Further, the first PDU according to the present modified example will be described in detail with reference to FIG. 15. FIG. 15 is a diagram illustrating an example of the format of the first PDU transmitted by the transmission device 100 according to the third modified example of the present disclosure.

As illustrated in FIG. 15, the frame transmitted by the transmission device 100 may be an aggregation frame obtained by aggregating the MPDUs serving as the first PDU. Further, all the MPDUs to be aggregated may be the first PDUs, and some MPDUs may be the first PDUs.

Figure 16:
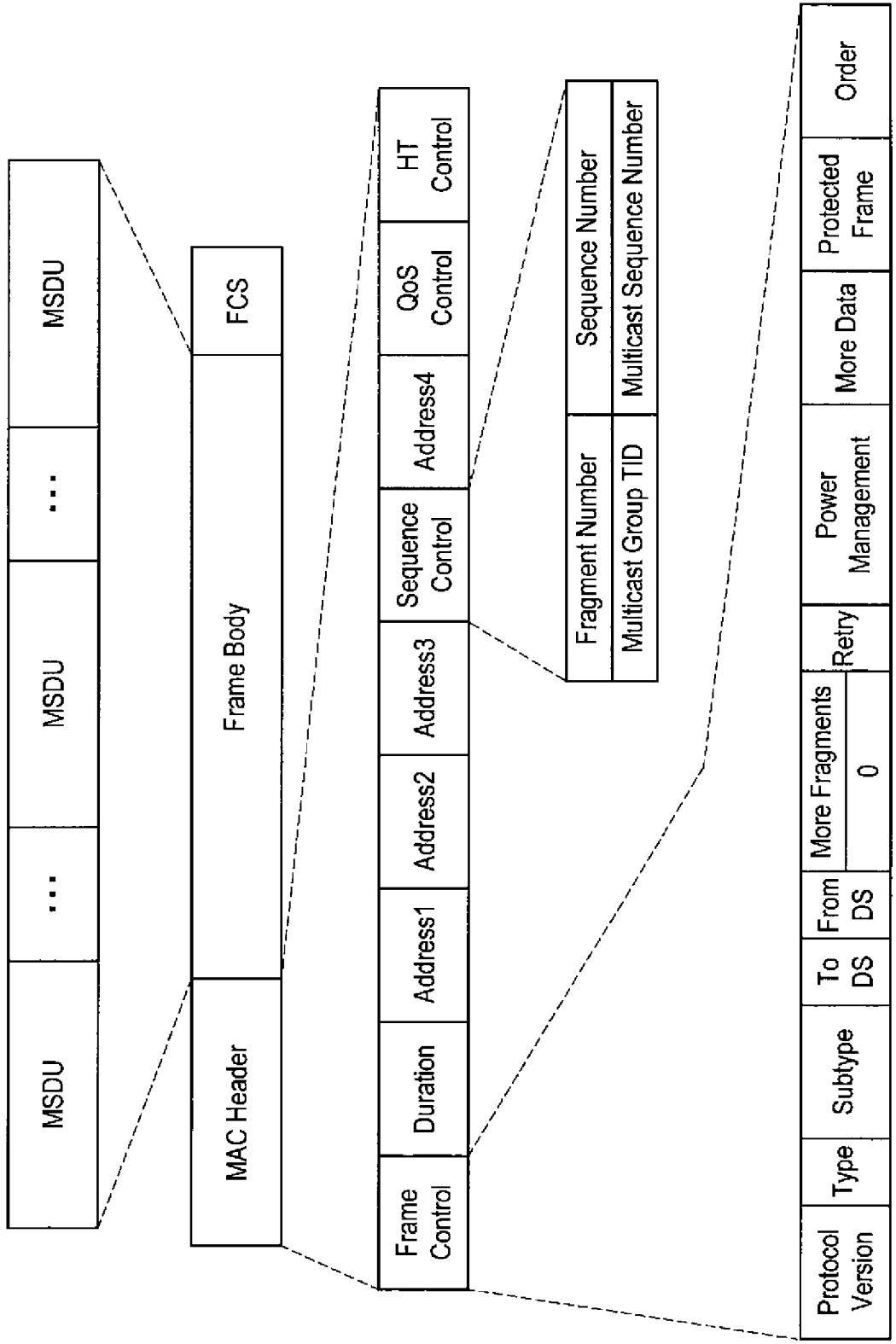
FIG. 16 is a diagram illustrating another example of a format of a first PDU transmitted by a transmission device according to the third modified example of one embodiment of the present disclosure.

Further, the first PDU transmitted by the transmission device 100 may be an aggregation frame obtained by concatenating a plurality of service data units (SDUs). Another form of the first PDU according to the present modified example will be described in detail with reference to FIG. 16. FIG. 16 is a diagram illustrating another example of the format of the first PDU transmitted by the transmission device 100 according to the third modified example of one embodiment of the present disclosure.

As illustrated in FIG. 16, the frame transmitted by the transmission device 100 may be an aggregation frame having a frame body obtained by aggregating a plurality of MAC SDUs (MSDUs) and a MAC header. In this case, one sequence number is allocated to a plurality of MSDUs.

As described above, according to the third modified example of one embodiment of the present disclosure, the first PDU includes a subframe in the aggregation frame. Therefore, since a plurality of first PDUs are communicated at a time, it is possible to improve the communication efficiency of the first PDU.

Further, the first PDU includes an aggregation frame obtained by concatenating a plurality of SDUs. Therefore, in a case in which one sequence number is allocated to a plurality of SDUs, the sequence number can be saved.

Therefore, it is difficult for the sequence number to reach the upper limit, and it is possible to further reduce the frequency of the communication of the BA frame.

3. APPLICATION EXAMPLE

The technology according to the present disclosure can be applied to various products. For example, the communication device 200 may be realized as mobile terminals such as smartphones, tablet personal computers (PCs), notebook PCs, portable game terminals, or digital cameras, fixed-type terminals such as television receivers, printers, digital scanners, or network storages, or car-mounted terminals such as car navigation devices. In addition, the communication device 200 may be realized as terminals that perform machine to machine (M2M) communication (also referred to as machine type communication (MTC) terminals) such as smart meters, vending machines, remotely controlled monitoring devices, or point of sale (POS) terminals. Furthermore, the communication device 200 may be wireless communication modules mounted in such terminals (for example, integrated circuit modules configured by one die).

On the other hand, for example, the communication device 100 may be realized as a wireless LAN access point (also referred to as a wireless base station) which has a router function or does not have a router function. The communication device 100 may be realized as a mobile wireless LAN router. The communication device 100 may also be a wireless communication module (for example, an integrated circuit module configured with one die) mounted on such devices.

3-1. First Application Example

Figure 17:
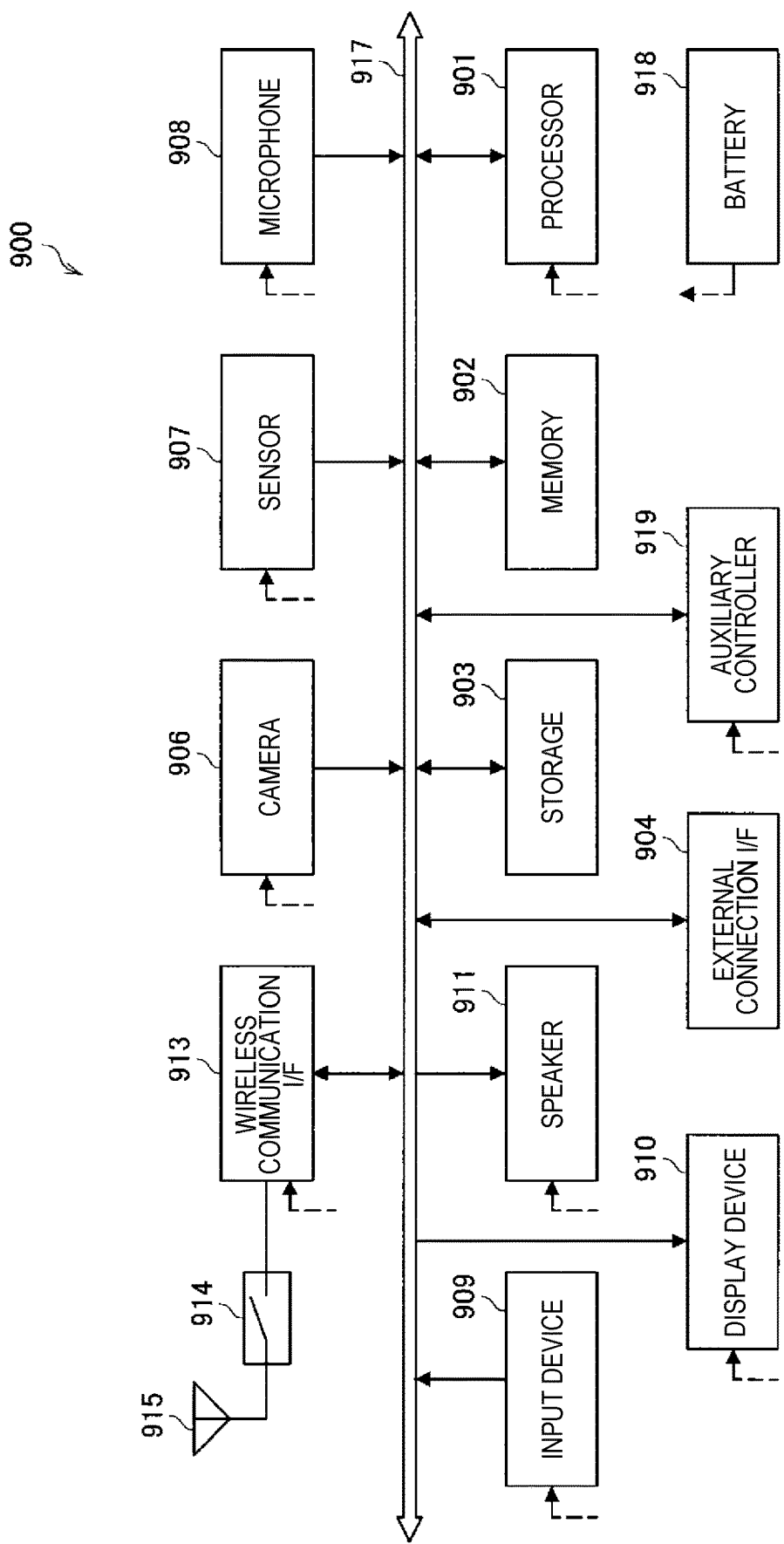
FIG. 17 is a block diagram illustrating an example of a schematic configuration of a smartphone.

FIG. 17 is a block diagram illustrating an example of a schematic configuration of a smartphone 900 to which the technology of the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system on chip (SoC), and controls functions of an application layer and other layers of the smartphone 900. The memory 902 includes random access memory (RAM) and read only memory (ROM), and stores data and programs executed by the processor 901. The storage 903 can include a storage medium such as a semiconductor memory or a hard disk. The external connection interface 904 is an interface for connecting an externally attachable device such as a memory card or a universal serial bus (USB) device to the smartphone 900.

The camera 906 has an image sensor, for example, a charge coupled device (CCD) or a complementary metal oxide semiconductor (CMOS), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive operation or information input from a user. The display device 910 has a screen such as a liquid crystal display (LCD), or an organic light emitting diode (OLED)

display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to establish wireless communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Note that, Wi-Fi Direct is different from the ad hoc mode. One of two terminals operates as an access point, and communication is performed directly between the terminals. The wireless communication interface 913 can typically include a baseband processor, a radio frequency (RF) circuit, a power amplifier, and the like. The wireless communication interface 913 may be a one-chip module on which a memory that stores a communication control program, a processor that executes the program, and a relevant circuit are integrated. The wireless communication interface 913 may support another kind of wireless communication scheme such as a cellular communication scheme, a near-field communication scheme, or a proximity wireless communication scheme in addition to the wireless LAN scheme. The antenna switch 914 switches a connection destination of the antenna 915 among a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals through the wireless communication interface 913.

Note that the smartphone 900 may include a plurality of antennas (for example, antennas for a wireless LAN or antennas for a proximity wireless communication scheme, or the like), without being limited to the example of FIG. 17. In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each of the blocks of the smartphone 900 illustrated in FIG. 17 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 17, the data processing unit 210, the control unit 220, and the wireless communication unit 230 described above with reference to FIG. 3 may be implemented in the wireless communication interface 913. Further, at least some of the functions may be implemented in the processor 901 or the auxiliary controller 919. For example, the data processing unit 210 acquires the data unit from the multicast frame on the basis of the sequence number information set for each multicast group stored in the multicast frame received by the wireless communication unit 130 and the multicast group information. Accordingly, it is possible to prevent the sequence numbers related to the multicast frames in the smartphone 900 from being discontinuous. Therefore, it is possible to suppress the decrease in the communication efficiency of the smartphone 900 in the multicast communication.

Note that the smartphone 900 may operate as a wireless access point (software AP) as the processor 901 executes the function of an access point at an application level. In addition, the wireless communication interface 913 may have the function of a wireless access point.

3-2. Second Application Example

Figure 18:
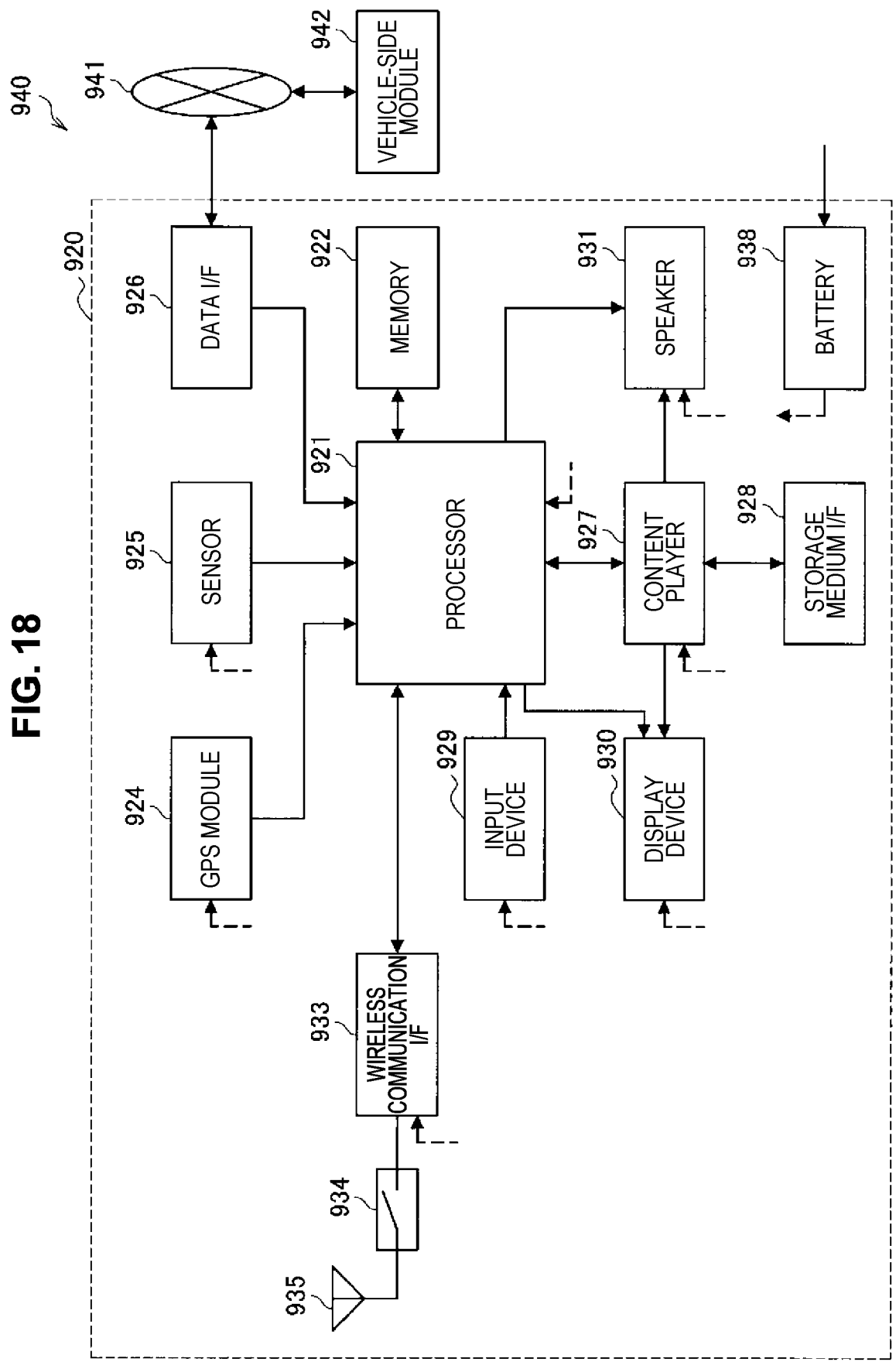
FIG. 18 is a block diagram illustrating an example of a schematic configuration of a car navigation device.

FIG. 18 is a block diagram illustrating an example of a schematic configuration of a car navigation device 920 to which the technology of the present disclosure can be applied. The car navigation device 920 includes a processor 921, a memory 922, a Global Positioning System (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes RAM and ROM storing data and programs executed by the processor 921.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a barometric sensor, and the like. The data interface 926 is connected with an in-vehicle network 941 via, for example, a terminal (not illustrated) to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive operation or information input from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, 11ad, and the like to execute wireless communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a one-chip module on which a memory that stores a communication control program, a processor that executes the program, and a relevant circuit are integrated. The wireless communication interface 933 may support another kind of wireless communication scheme such as a near-field communication scheme, a proximity wireless communication scheme, or the cellular communication scheme in addition to the wireless LAN scheme. The antenna switch 934 switches a connection destination of the antenna 935 among a plurality of circuits included in the wireless communication interface 933. The antenna 935 has a single or a plurality of antenna elements and is used for transmission and reception of wireless signals from and to the wireless communication interface 933.

Note that the car navigation device 920 may include a plurality of antennas, without being limited to the example of FIG. 18. In this case, the antenna switch 934 may be omitted from the configuration of the car navigation device 920.

The battery 938 supplies electric power to each of the blocks of the car navigation device 920 illustrated in FIG. 18 via power supply lines partially indicated by dashed lines in the drawing. In addition, the battery 938 accumulates electric power supplied from the vehicle side.

In the car navigation device 920 illustrated in FIG. 18, the data processing unit 210, the control unit 220, and the wireless communication unit 230 described above with reference to FIG. 3 may be implemented in the wireless communication interface 913. Further, at least some of the functions may be implemented in the processor 921. For example, the data processing unit 210 acquires the data unit from the multicast frame on the basis of the sequence number information set for each multicast group stored in the multicast frame received by the wireless communication unit 130 and the multicast group information. Accordingly, it is possible to prevent the sequence numbers related to the multicast frames in the car navigation device 920 from being discontinuous. Therefore, it is possible to suppress the decrease in the communication efficiency of the car navigation device 920 in the multicast communication.

Further, the wireless communication interface 933 may operate as the communication device 100 and may provide a wireless connection to a terminal carried by the user who rides in the vehicle. At this time, for example, the control unit 120 causes the data processing unit 110 to generate the multicast frame including the sequence number information set for each multicast group and the multicast group information. Then, the wireless communication unit 130 transmits the generated multicast frame. Accordingly, it is possible to prevent the sequence numbers related to the multicast frame from being discontinuous in the terminal carried by the user. Therefore, it is possible to suppress the decrease in the efficiency of communication between the terminal of the user and the car navigation device 920 in the multicast communication.

Further, the technology of the present disclosure may be realized as an in-vehicle system (or a vehicle) 940 including one or more blocks of the above-described car navigation device 920, the in-vehicle network 941, and a vehicle-side module 942. The vehicle-side module 942 generates vehicle-side data such as a vehicle speed, the number of engine rotations, or failure information and outputs the generated data to the in-vehicle network 941.

3-3. Third Application Example

Figure 19:
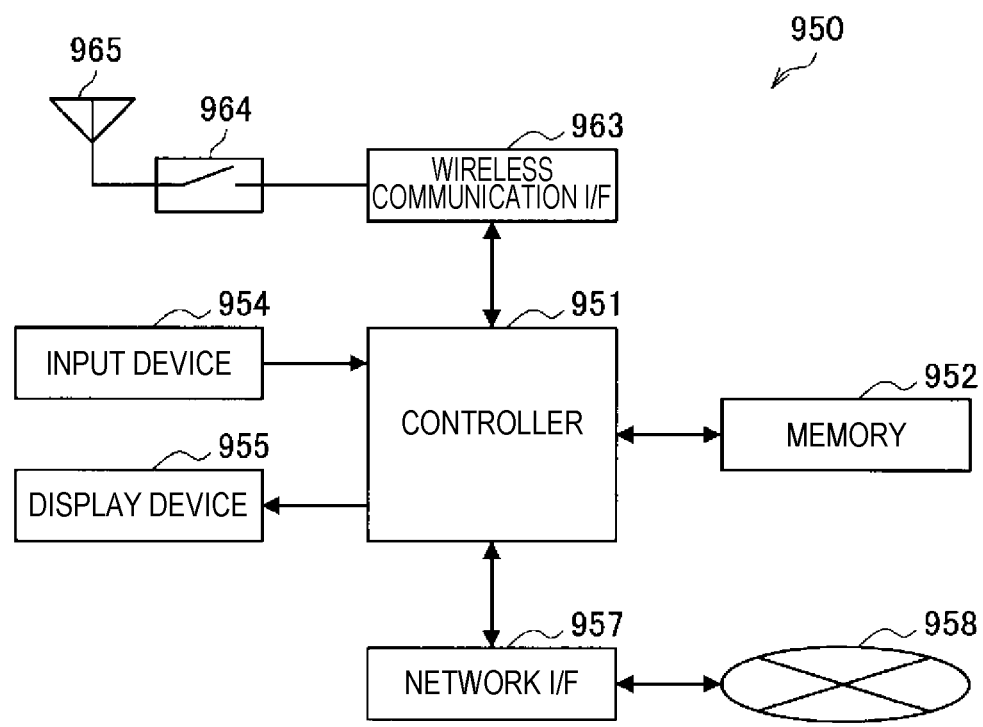
FIG. 19 is a block diagram illustrating an example of a schematic configuration of a wireless access point.

FIG. 19 is a block diagram illustrating an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and upper layers of the wireless access point 950. The memory 952 includes RAM and ROM and stores a program executed by the controller 951 and various kinds of control data (for example, a terminal list, a routing table, an encryption key, security settings, and a log).

The input device 954 includes, for example, a button or a switch, and receives operation performed by a user. The display device 955 includes an LED lamp and displays an operation status of the wireless access point 950.

The network interface 957 is a wired communication interface that connects the wireless access point 950 with a wired communication network 958. The network interface 957 may include a plurality of connection terminals. The wired communication network 958 may be a LAN such as Ethernet (registered trademark) or may be a wide area network (WAN).

The wireless communication interface 963 supports one or more wireless LAN standards of IEEE 802.11a, 11b, 11g, 11n, 11ac, 11ad, and the like to supply wireless connection to a nearby terminal as an access point. The wireless communication interface 963 can typically include a baseband processor, an RF circuit, and a power amplifier. The wireless communication interface 963 may be a one-chip module in which memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 19, the data processing unit 110, the control unit 120, and the wireless communication unit 130 described above with reference to FIG. 3 may be realized by the wireless communication interface 963. In addition, at least a part of these functions may be implemented by the controller 951. For example, the control unit 120 causes the data processing unit 110 to generate the multicast frame including the sequence number information set for each multicast group and the multicast group information. Then, the wireless communication unit 130 transmits the generated multicast frame. Accordingly, it is possible to prevent the sequence numbers related to the multicast frame from being discontinuous in the terminal communicating with the wireless access point 950. Therefore, it is possible to suppress the decrease in the efficiency of communication between the terminal of the user and the wireless access point 950 in the multicast communication.

4. CONCLUSION

As described above, according to one embodiment of the present disclosure, since the sequence number is set for each multicast group, it is possible to prevent the sequence numbers related to the multicast frame from becoming discontinuous even though all the multicast frames are successfully received in the reception device 200. Therefore, since standing by until the frame which is not transmitted is received is prevented while securing the region of the reception buffer 215, even in a case in which a plurality of types of multicast communication which differ in the multicast group serving as the destination are performed, it is possible to improve the efficiency of the wireless communication.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the above embodiment, the multicast group information is set for each piece of information specifying a type of communication traffic, but the present technology is not limited to this example. For example, the multicast group information may be set for each piece of information specifying a service provided using communication of the PDU. For example, the multicast group TID may be set for each piece of service information in the communication upper layer.

Further, the description for the first PDU may be applied to the second PDU. For example, the frame format of the second PDU may be substantially the same as the frame format of the first PDU.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, steps illustrated in the flowcharts of the above embodiment include not only processes which are chronologically performed in accordance with the described order but also processes which are not necessarily chronologically performed but performed in parallel or individually as well. Further, it is needless to say that even in steps which are processed chronologically, the order can be appropriately changed depending on circumstances.

In addition, it is also possible to produce a computer program for causing hardware incorporated in communication devices 100 and 200 to exhibit functions equivalent to those of the respective logic configurations of the aforementioned the communication devices 100 and 200. In addition, a storage medium that stores the computer program therein is also provided.

Additionally, the present technology may also be configured as below.

(1)

A communication device, including:

a processing unit configured to generate a first protocol data unit (PDU) including first sequence number information specifying a first sequence number of a data unit set for each multicast group, multicast group information specifying a multicast group, and a data unit; and a wireless communication unit configured to transmit the first PDU generated by the processing unit.

(2)

The communication device according to (1), in which the first sequence number information and the multicast group information are stored in a header of the first PDU.

(3)

The communication device according to (2), in which the header includes an error detection code.

(4)

The communication device according to any one of (1) to (3), in which the multicast group information further includes information specifying a communication scheme other than multicast communication.

(5)

The communication device according to any one of (1) to (4), in which a communication scheme other than the multicast communication includes broadcast communication, the processing unit generates a second PDU including second sequence number information specifying a second sequence number set for the data unit to be broadcasted, the multicast group information specifying broadcast communication, and a data unit, and the wireless communication unit transmits the second PDU generated by the processing unit.

(6)

The communication device according to any one of (1) to (5), in which the multicast group information includes the multicast group information set for each piece of information specifying a communication purpose.

(7)

The communication device according to (6), in which the information specifying the communication purpose includes information specifying a type of communication traffic.

(8)

The communication device according to any one of (1) to (7), in which the wireless communication unit receives a block acknowledge including the multicast group information and the first sequence number information related to the data unit of the multicast group specified from the multicast group information.

(9)

The communication device according to (8), in which the wireless communication unit transmits a block acknowledge request including the multicast group information, and the wireless communication unit receives the block acknowledge as a response to the block acknowledge request.

(10)

The communication device according to any one of (1) to (9), in which the multicast group information is stored in a field in which division information for the first PDU is stored.

(11)

The communication device according to any one of (1) to (10), in which the first PDU includes a sub frame in an aggregation frame or an aggregation frame obtained by concatenating a plurality of service data units (SDUs).

(12)

A communication device, including:

a wireless communication unit configured to receive at least a part of a first protocol data unit (PDU) including first sequence number information specifying a first sequence number of a data unit set for each multicast group, multicast group information specifying a multicast group, and a data unit; and a processing unit configured to acquire the data unit from the first PDU on a basis of the first sequence number information and the multicast group information stored in at least the part of the first PDU received by the wireless communication unit.

(13)

The communication device according to (12), in which the processing unit acquires the data unit stored in the first PDU in a case in which the first sequence number specified from the first sequence number information does not coincide with a sequence number of the acquired data unit belonging to the multicast group specified from the multicast group information.

(14)

The communication device according to (12) or (13), in which the wireless communication unit transmits a block acknowledge including the multicast group information and the first sequence number information related to the data unit of the multicast group specified from the multicast group information.

(15)

The communication device according to (14), in which the wireless communication unit receives a block acknowledge request including the multicast group information, and the wireless communication unit transmits the block acknowledge as a response to the block acknowledge request.

(16)

The communication device according to (14) or (15), in which the wireless communication unit transmits the block acknowledge if the first sequence number of the acquired data unit reaches a limit of a range used as the first sequence number.

(17)

A communication method, including, by a processor:

generating a first protocol data unit (PDU) including first sequence number information specifying a first sequence number of a data unit set for each multicast group, multicast group information specifying a multicast group, and a data unit; and transmitting the generated first PDU.

(18)

A communication method, including, by a processor:

receiving at least a part of a first protocol data unit (PDU) including first sequence number information specifying a first sequence number of a data unit set for each multicast group, multicast group information specifying a multicast group, and a data unit; and acquiring the data unit from the first PDU on a basis of the first sequence number information and the multicast group information stored in at least the part of the received first PDU.

(19)

A program causing a computer to implement:

a processing function of generating a first protocol data unit (PDU) including first sequence number information specifying a first sequence number of a data unit set for each multicast group, multicast group information specifying a multicast group, and a data unit; and a wireless communication function of transmitting the first PDU generated by the processing unit.

(20)

A program causing a computer to implement:

a wireless communication function of receiving at least a part of a first protocol data unit (PDU) including first sequence number information specifying a first sequence number of a data unit set for each multicast group, multicast group information specifying a multicast group, and a data unit; and a processing function of acquiring the data unit from the first PDU on a basis of the first sequence number information and the multicast group information stored in at least the part of the first PDU received by the wireless communication unit.

REFERENCE SIGNS LIST 100 transmission device
110, 210 data processing unit
120, 220 control unit
130, 230 wireless communication unit
200 reception device

The invention claimed is:

1. A communication device, comprising:
a processor configured to generate:
at least one first protocol data unit (PDU) for a first multicast group of a plurality of multicast groups, and
at least one second PDU for a second multicast group of the plurality of multicast groups,
wherein a header of each of the at least one first PDU includes:
first multicast group information that includes an identifier corresponding to the first multicast group, and
a first multicast group specific sequence number of a data unit carried by the corresponding first PDU,
wherein each of the at least one first PDU includes the corresponding first PDU data unit,
wherein a header of each of the at least one second PDU includes:
second multicast group information that includes an identifier corresponding to the second multicast group, and
a second multicast group specific sequence number of a data unit carried by the corresponding second PDU, and
wherein each of the at least one second PDU includes the corresponding second PDU data unit; and
a transceiver configured to transmit the at least one first PDU and the at least one second PDU.

2. The communication device according to claim 1, wherein at least one of the at least one first PDU or the at least one second PDU includes a corresponding error detection code.

3. The communication device according to claim 1,
wherein the processor is configured to generate at least one third PDU,
wherein a header of each of the at least one third PDU includes:
a third identifier corresponding to a broadcast to the plurality of multicast groups, and
a broadcast specific sequence number of a data unit carried by the corresponding third PDU,
wherein each of the at least one third PDU includes the corresponding third PDU data unit, and
wherein the transceiver is configured to transmit the at least one third PDU.

4. The communication device according to claim 1, wherein at least one of the first multicast group information or the second multicast group information further includes information indicating a data type of the respective first or second PDU data unit.

5. The communication device according to claim 1, wherein, upon the transceiver transmitting a preset number of the at least one first PDU, the transceiver is configured to transmit a first multicast group specific block acknowledge request including the identifier corresponding to the first multicast group.

6. The communication device according to claim 5, wherein the transceiver is configured to receive a block acknowledge message as a response to the block acknowledge request, the block acknowledge message indicating that all of the preset number of first PDU data units have been received or identifying any unreceived first PDU data units with corresponding multicast group specific sequence numbers.

7. The communication device according to claim 1, wherein the first multicast group information is stored in a field in which division information for the at least one first PDU is stored.

8. The communication device according to claim 1, wherein the at least one first PDU includes a sub frame in an aggregation frame or an aggregation frame obtained by concatenating a plurality of service data units (SDUs).

9. The communication device according to claim 1,
wherein the at least one first PDU includes at least two first PDUs, and
wherein the first multicast group specific sequence numbers corresponding to the at least two first PDUs are sequential.

10. The communication device according to claim 1,
wherein the at least one second PDU includes at least two second PDUs, and
wherein the second multicast group specific sequence numbers corresponding to the at least two second PDUs are sequential.

11. A communication device configured to transceiver data in a first multicast group of a plurality of multicast groups, comprising:
a transceiver configured to receive:
at least one first protocol data unit (PDU) for the first multicast group, and
at least one second PDU for a second multicast group of the plurality of multicast groups,
wherein a header of each of the at least one first PDU includes:
first multicast group information that includes an identifier corresponding to the first multicast group, and
a first multicast group specific sequence number of a data unit carried by the corresponding first PDU,
wherein each of the at least one first PDU includes the corresponding first PDU data unit,
wherein a header of each of the at least one second PDU includes:
second multicast group information that includes an identifier corresponding to the second multicast group, and
a second multicast group specific sequence number of a data unit carried by the corresponding second PDU, and
wherein each of the at least one second PDU includes the corresponding second PDU data unit; and
a processor configured to process the at least one first PDU while ignoring the at least one second PDU based on the identifier corresponding to the first multicast group.

12. The communication device according to claim 11,
wherein the transceiver is configured to receive a first multicast group specific block acknowledge request including the identifier corresponding to the first multicast group, the first multicast group specific block acknowledge request indicating that a preset number of the at least one first PDU has been transmitted to the communication device, and
wherein, upon evaluating the corresponding received first multicast group specific sequence numbers, the transceiver is configured to transmit a block acknowledge message as a response to the block acknowledge request, the block acknowledge message indicating that all of the preset number of first PDU data units have been received or identifying any unreceived first PDU data units with corresponding multicast group specific sequence numbers.

13. The communication device according to claim 11,
wherein the transceiver is configured to receive at least one third PDU,
wherein a header of each of the at least one third PDU includes:
a third identifier corresponding to a broadcast to the plurality of multicast groups, and
a third broadcast specific sequence number of a data unit carried by the corresponding third PDU, and
wherein each of the at least one third PDU includes the corresponding third PDU data unit, and
wherein the processor is configured to process the at least one third PDU.

14. The communication device according to claim 11, wherein at least one of the first multicast group information or the second multicast group information further includes information indicating a data type of the respective first or second PDU data unit.

15. The communication device according to claim 11,
wherein the at least one first PDU includes at least two first PDUs, and
wherein the first multicast group specific sequence numbers corresponding to the at least two first PDUs are sequential.

16. The communication device according to claim 11,
wherein the at least one second PDU includes at least two second PDUs, and
wherein the second multicast group specific sequence numbers corresponding to the at least two second PDUs are sequential.

17. A communication method performed by a wireless communication device, the method comprising:
receiving:
at least one first protocol data unit (PDU) for the first multicast group, and
at least one second PDU for a second multicast group of the plurality of multicast groups,
wherein a header of each of the at least one first PDU includes:
first multicast group information that includes an identifier corresponding to the first multicast group, and
first multicast group specific sequence number of a data unit carried by the corresponding first PDU,
wherein each of the at least one first PDU includes the corresponding first PDU data unit,
wherein a header of each of the at least one second PDU includes:
a second multicast group information that includes an identifier corresponding to the second multicast group, and
a second multicast group specific sequence number of a data unit carried by the corresponding second PDU, and
wherein each of the at least one second PDU includes the corresponding second PDU data unit; and
processing the at least one first PDU while ignoring the at least one second PDU based on the identifier corresponding to the first multicast group.

18. The method of claim 17, further comprising:
receiving a first multicast group specific block acknowledge request including the identifier corresponding to the first multicast group, the first multicast group specific block acknowledge request indicating that a preset number of the at least one first PDU has been transmitted to the communication device, and
upon evaluating the corresponding received first multicast group specific sequence numbers, transmitting a block acknowledge message as a response to the block acknowledge request, the block acknowledge message indicating that all of the preset number of first PDU data units have been received or identifying any unreceived first PDU data units with corresponding multicast group specific sequence numbers.

19. The method of claim 17, further comprising:
receiving at least one third PDU,
wherein a header of each of the at least one third PDU includes:
    a third identifier corresponding to a broadcast to the plurality of multicast groups,
    a broadcast specific sequence number of a data unit carried by the corresponding third PDU, and
wherein each of the at least one third PDU includes the corresponding third PDU data unit; and
processing the at least one third PDU.

20. The method according to claim 17,
wherein the at least one first PDU includes at least two first PDUs, and
wherein the first multicast group specific sequence numbers corresponding to the at least two first PDUs are sequential.

21. The method according to claim 17,
wherein the at least one second PDU includes at least two second PDUs, and
wherein the second multicast group specific sequence numbers corresponding to the at least two second PDUs are sequential.

* * * * *